(12) United States Patent
Bharadwaj et al.

(10) Patent No.: US 12,004,143 B2
(45) Date of Patent: Jun. 4, 2024

(54) RESOURCE RESERVATION TECHNIQUES FOR WIRELESS COMMUNICATIONS

(71) Applicant: QUALCOMM Incorporated, San Diego, CA (US)

(72) Inventors: Arjun Bharadwaj, Cupertino, CA (US); Tien Viet Nguyen, Bridgewater, NJ (US); Sudhir Kumar Baghel, Hillsborough, NJ (US); Kapil Gulati, Hillsborough, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 16/739,975

(22) Filed: Jan. 10, 2020

(65) Prior Publication Data

US 2020/0229205 A1 Jul. 16, 2020

Related U.S. Application Data

(60) Provisional application No. 62/791,696, filed on Jan. 11, 2019.

(51) Int. Cl.
*H04W 72/12* (2023.01)
*H04L 5/00* (2006.01)
*H04W 72/20* (2023.01)

(52) U.S. Cl.
CPC ........... *H04W 72/12* (2013.01); *H04L 5/0048* (2013.01); *H04W 72/20* (2023.01)

(58) Field of Classification Search
CPC .. H04W 72/12; H04W 72/0406; H04L 5/0048
See application file for complete search history.

(56) References Cited

U.S. PATENT DOCUMENTS 11,064,461 B2 * 7/2021 Li ........................ H04W 28/26
2017/0331577 A1 11/2017 Parkvall et al.
(Continued)

FOREIGN PATENT DOCUMENTS

CN 109155985 A 1/2019
EP 3499921 A1 6/2019
(Continued)

OTHER PUBLICATIONS

International Search Report and Written Opinion—PCT/US2020/013245—ISA/EPO—dated Jul. 14, 2020 (191130WO).
(Continued)

*Primary Examiner* — Rhonda L Murphy
(74) *Attorney, Agent, or Firm* — Holland & Hart LLP

(57) ABSTRACT

Methods, systems, and devices for wireless communications are described in which a transmitting user equipment (UE) may determine a data packet to transmit to another UE and determine a set of candidate resources for transmission of the data packet based on a set of time-frequency resources that are allocated for UE-to-UE communications. A resource reservation signal (RRS) may be transmitted to indicate to other UEs that the set of candidate resources have been reserved by a UE. The RRS may be transmitted such that the RRS may be differentiated from other regular transmissions based at least in part on information provided by a control channel associated with the RRS or a payload of a transmission that includes the RRS. The RRS may indicate one or more of a size of an allocation of the resources and multiple locations of the resources within a time-frequency resource pool.

19 Claims, 18 Drawing Sheets

(56) References Cited

U.S. PATENT DOCUMENTS

| | | | |
|---|---|---|---|
| 2019/0208504 A1 | 7/2019 | Yasukawa et al. | |
| 2020/0029340 A1* | 1/2020 | He | H04W 76/14 |
| 2020/0205165 A1* | 6/2020 | Huang | H04L 1/1854 |
| 2021/0314750 A1* | 10/2021 | Nguyen | G08G 1/22 |
| 2021/0385694 A1* | 12/2021 | Freda | H04W 74/0816 |
| 2021/0410129 A1* | 12/2021 | Freda | H04W 76/14 |

FOREIGN PATENT DOCUMENTS

| | | |
|---|---|---|
| WO | WO-2018030541 A1 | 2/2018 |
| WO | WO-2018175553 A1 | 9/2018 |

OTHER PUBLICATIONS

NTT DOCOMO, et al., "Transmitter UE Behaviour for Sensing-Based Resource Allocation", 3GPP Draft, 3GPP TSG RAN WG1 Meeting #85, R1-165192 Reservation and Sensing Sidelink, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 14, 2016 (May 14, 2016), XP051096221, 7 Pages, Retrieved from the Internet: URL: http://www.3gpp.org/ftp/tsg_ran/WG1_RL1/TSGR1_85/Docs/, [retrieved on May 14, 2016], paragraph [0002]-paragraph [0004].
Partial International Search Report—PCT/US2020/013245—ISA/EPO—dated Apr. 17, 2020 (191130WO).

* cited by examiner

GP 305

Data/RRS Transmission Control Information 310

RRS Payload / Sidelink Data 315

GP 405

Part 1 Control Information 410

Part 2 Control Information 415

RRS Payload / Sidelink Data 420

400

GP With Predefined Bit Sequence 505

RRS Control Information 510

RRS Payload 515

500

GP 605

Data Transmission Control Information 610

RRS Data 615

Sidelink Data 620

RESOURCE RESERVATION TECHNIQUES FOR WIRELESS COMMUNICATIONS

CROSS REFERENCE

The present Application for Patent claims the benefit of U.S. Provisional Patent Application No. 62/791,696 by BHARADWAJ et al., entitled "RESOURCE RESERVATION TECHNIQUES FOR VEHICLE-TO-VEHICLE COMMUNICATIONS," filed Jan. 11, 2019, assigned to the assignee hereof, and which is expressly incorporated reference herein.

INTRODUCTION

The following relates generally to wireless communications, and more specifically to managing resources for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for direct communications between wireless devices (e.g., direct communications between multiple UEs). Examples of direct communications include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, and the like.

Some wireless communication systems may support direct communications between UEs for a number of UEs (e.g., in vehicle-to-everything (V2X) communications), which may result in collisions or other interference on resources utilized by multiple UEs. Further, some UEs may operate according to a half-duplexing mode such that the UE may be unable to transmit and receive signals at the same time due to the effects of interference between an incoming transmission and an outgoing transmission. In systems employing half-duplex UEs or a number of UEs that are at risk of interfering with one another, resources may be assigned to UEs periodically (e.g., based on a predefined periodicity) and the resources of a certain time interval may be reserved for one or more UEs. Scheduling resources in this manner may be inefficient and may result in poor performance (e.g., in cases where data packet size varies and resource allocation sizes are fixed).

SUMMARY

A method of wireless communication at a first (e.g., receiving) user equipment (UE) in a sidelink communication system is described. The method may include determining a time-frequency resource pool that provides wireless resources available for sidelink communications, receiving a first transmission from a second (e.g., transmitting) UE in the sidelink communication system via a subset of resources of the time-frequency resource pool, and determining, based on information provided by one or more of a control channel associated with the first transmission or a payload of the first transmission, whether the first transmission contains a resource reservation signal (RRS) that indicates resources of the time-frequency resource pool or a transmission of the second UE.

An apparatus for wireless communication at a first UE in a sidelink communication system is described. The apparatus may include a transceiver, a processor, and memory coupled to the processor. The processor and the memory may be configured to determine a time-frequency resource pool that provides wireless resources available for sidelink communications, receive a first transmission from a second UE in the sidelink communication system via a subset of resources of the time-frequency resource pool, and determine, based on information provided by one or more of a control channel associated with the first transmission or a payload of the first transmission, whether the first transmission contains a resource reservation signal (RRS) that indicates resources of the time-frequency resource pool or a transmission of the second UE.

Another apparatus for wireless communication at a first UE in a sidelink communication system is described. The apparatus may include means for determining a time-frequency resource pool that provides wireless resources available for sidelink communications, receiving a first transmission from a second UE in the sidelink communication system via a subset of resources of the time-frequency resource pool, and determining, based on information provided by one or more of a control channel associated with the first transmission or a payload of the first transmission, whether the first transmission contains a resource reservation signal (RRS) that indicates resources of the time-frequency resource pool or a transmission of the second UE.

A non-transitory computer-readable medium storing code for wireless communication at a first UE in a sidelink communication system is described. The code may include instructions executable by a processor to determine a time-frequency resource pool that provides wireless resources available for sidelink communications, receive a first transmission from a second UE in the sidelink communication system via a subset of resources of the time-frequency resource pool, and determine, based on information provided by one or more of a control channel associated with the first transmission or a payload of the first transmission, whether the first transmission contains a resource reservation signal (RRS) that indicates resources of the time-frequency resource pool or a transmission of the second UE.

In some examples of the method, apparatuses, and non-transitory computer-readable medium described herein, the determining may include operations, features, means, or instructions for decoding a first portion of the control channel, where the first portion is a common portion to both RRS and transmissions, and determining that the first transmission contains RRS based on an indication in the first portion that indicates an RRS transmission. In some examples of the method, apparatuses, and non-transitory computer-readable medium described herein, a second portion of the control channel contains information specific to transmissions.

In some examples of the method, apparatuses, and non-transitory computer-readable medium described herein, the determining may include operations, features, means, or instructions for determining a set of decoding hypotheses for decoding the control channel, where a first subset of the set of decoding hypotheses corresponds to RRS transmissions and a second subset of the set of decoding hypotheses corresponds to transmissions, performing decoding on the first transmission based on the set of decoding hypotheses, and determining that the first transmission contains RRS or data based on a successful decoding hypothesis from the first subset of the set of decoding hypotheses or the second subset of the set of decoding hypotheses. In some examples of the method, apparatuses, and non-transitory computer-readable medium described herein, the control channel includes information indicating RRS and a CRC.

In some examples of the method, apparatuses, and non-transitory computer-readable medium described herein, a bit that indicates whether the first transmission contains RRS or data, an RRS size indication, a size of a resource allocation of the resources of the time-frequency resource pool that are reserved, a demodulation reference signal (DMRS) scheme of the payload of the first transmission, a UE identification of the second UE, a time period associated with the resources of the time-frequency resource pool that are reserved, a priority of a transmission to be transmitted in the resources of the time-frequency resource pool that are reserved, or and any combinations thereof.

In some examples of the method, apparatuses, and non-transitory computer-readable medium described herein, the second portion of the control channel includes one or more of a rank indication (RI) of the first transmission, a modulation and coding scheme (MCS) of the first transmission, a transmission mode (TM) of the first transmission, a retransmission number of a data payload of the first transmission, a schedule for one or more retransmissions of the data payload of the first transmission, or any combinations thereof. In some examples of the method, apparatuses, and non-transitory computer-readable medium described herein, the first UE decodes the second portion of the control channel when the first portion of the control channel indicates that the first transmission is a transmission.

In some examples of the method, apparatuses, and non-transitory computer-readable medium described herein, the determining may include operations, features, means, or instructions for determining a predetermined bit sequence in a first symbol of the first transmission that is associated with an RRS or transmission.

In some examples of the method, apparatuses, and non-transitory computer-readable medium described herein, the determining may include operations, features, means, or instructions for determining an RRS indication in the payload of the first transmission. In some examples of the method, apparatuses, and non-transitory computer-readable medium described herein, the payload of the first transmission includes a medium access control (MAC) control element (CE), information related to the resources of the time-frequency resource pool that are reserved by the second UE, and the transmission of the second UE.

In some examples of the method, apparatuses, and non-transitory computer-readable medium described herein, the MAC-CE and information related to the resources of the time-frequency resource pool are included in an initial portion of the payload of the first transmission, and the transmission of the second UE is included in a subsequent portion of the payload of the first transmission, and where a first modulation and coding scheme (MCS) or first spectral efficiency of the initial portion is less than or equal to a second MCS or second spectral efficiency of the subsequent portion.

A method of wireless communication at a first UE in a sidelink communication system is described. The method may include determining a time-frequency resource pool that provides wireless resources available for sidelink communications, determining that a transmission to one or more UEs in the sidelink communication system is to be transmitted, selecting resources of the time-frequency resource pool for transmission of the transmission, formatting a resource reservation signal (RRS) that indicates a reservation of the resources of the time-frequency resource pool into a first transmission, where an indication that the first transmission includes the RRS is provided in one or more of a control channel associated with the first transmission or a payload of the first transmission, and transmitting the first transmission to the one or more UEs.

An apparatus for wireless communication at a first UE in a sidelink communication system is described. The apparatus may include a processor and a memory coupled to the processor, and instructions stored in the memory. The processor and the memory configured to determine a time-frequency resource pool that provides wireless resources available for sidelink communications, determine that a transmission to one or more UEs in the sidelink communication system is to be transmitted, select resources of the time-frequency resource pool for transmission of the transmission, format a resource reservation signal (RRS) that indicates a reservation of the resources of the time-frequency resource pool into a first transmission, where an indication that the first transmission includes the RRS is provided in one or more of a control channel associated with the first transmission or a payload of the first transmission, and transmit the first transmission to the one or more UEs.

Another apparatus for wireless communication at a first UE in a sidelink communication system is described. The apparatus may include means for determining a time-frequency resource pool that provides wireless resources available for sidelink communications, determining that a transmission to one or more UEs in the sidelink communication system is to be transmitted, selecting resources of the time-frequency resource pool for transmission of the transmission, formatting a resource reservation signal (RRS) that indicates a reservation of the resources of the time-frequency resource pool into a first transmission, where an indication that the first transmission includes the RRS is provided in one or more of a control channel associated with the first transmission or a payload of the first transmission, and transmitting the first transmission to the one or more UEs.

A non-transitory computer-readable medium storing code for wireless communication at a first UE in a sidelink communication system is described. The code may include instructions executable by a processor to determine a time-frequency resource pool that provides wireless resources available for sidelink communications, determine that a transmission to one or more UEs in the sidelink communication system is to be transmitted, select resources of the time-frequency resource pool for transmission of the transmission, format a resource reservation signal (RRS) that indicates a reservation of the resources of the time-frequency resource pool into a first transmission, where an indication that the first transmission includes the RRS is provided in one or more of a control channel associated with the first transmission or a payload of the first transmission, and transmit the first transmission to the one or more UEs.

In some examples of the method, apparatuses, and non-transitory computer-readable medium described herein, the formatting may include operations, features, means, or instructions for encoding the control channel according to a decoding candidate associated with a RRS transmission. In some examples of the method, apparatuses, and non-transitory computer-readable medium described herein, the control channel includes information indicating RRS and a CRC.

In some examples of the method, apparatuses, and non-transitory computer-readable medium described herein, the formatting may include operations, features, means, or instructions for formatting the RRS into a first portion of the control channel, where the first portion is a common portion to both RRS and transmissions, and where a second portion of the control channel is configured to include information specific to transmissions.

In some examples of the method, apparatuses, and non-transitory computer-readable medium described herein, the first portion may include a bit that indicates whether the first transmission contains RRS or data, an RRS size indication, a size of a resource allocation of the resources of the time-frequency resource pool that are reserved, a demodulation reference signal (DMRS) scheme of the payload of the first transmission, a UE identification of the first UE, a time period associated with the resources of the time-frequency resource pool that are reserved, a priority of a transmission to be transmitted in the resources of the time-frequency resource pool that are reserved, or any combinations thereof.

In some examples of the method, apparatuses, and non-transitory computer-readable medium described herein, the second portion may include one or more of a rank indication (RI) of the first transmission, a modulation and coding scheme (MCS) of the first transmission, a transmission mode (TM) of the first transmission, a retransmission number of a data payload of the first transmission, a schedule for one or more retransmissions of the data payload of the first transmission, or any combinations thereof.

In some examples of the method, apparatuses, and non-transitory computer-readable medium described herein, the formatting may include operations, features, means, or instructions for transmitting a predetermined bit sequence in a first symbol of the first transmission that is associated with an RRS or transmission.

In some examples of the method, apparatuses, and non-transitory computer-readable medium described herein, the formatting may include operations, features, means, or instructions for providing an RRS indication in the payload of the first transmission. In some examples of the method, apparatuses, and non-transitory computer-readable medium described herein, the payload of the first transmission includes a MAC-CE, information related to the resources of the time-frequency resource pool that are reserved by the first UE, and a transmission of the first UE.

In some examples of the method, apparatuses, and non-transitory computer-readable medium described herein, the MAC-CE and information related to the resources of the time-frequency resource pool are included in an initial portion of the payload of the first transmission, and the transmission of the first UE is included in a subsequent portion of the payload of the first transmission, and where a first modulation and coding scheme (MCS) or first spectral efficiency of the initial portion is less than or equal to a second MCS or second spectral efficiency of the subsequent portion.

A method of wireless communication at a UE in a sidelink communications system is described. The method may include determining a resource reservation signal (RRS) that indicates resources of a time-frequency resource pool available for sidelink communications for a transmission, the RRS indicating multiple sizes of an allocation of the resources and multiple locations of the resources within the time-frequency resource pool and communicating with one or more other UEs in the sidelink communications system based on the RRS.

An apparatus for wireless communication at a UE in sidelink communications system is described. The apparatus may include a processor and a memory coupled to the processor. The memory and the processor may be configured to determine a resource reservation signal (RRS) that indicates resources of a time-frequency resource pool available for sidelink communications for a transmission, the RRS indicating multiple sizes of an allocation of the resources and multiple locations of the resources within the time-frequency resource pool and communicate with one or more other UEs in the sidelink communications system based on the RRS.

Another apparatus for wireless communication at a UE in a sidelink communications system is described. The apparatus may include means for determining a resource reservation signal (RRS) that indicates resources of a time-frequency resource pool available for sidelink communications for a transmission, the RRS indicating multiple sizes of an allocation of the resources and multiple locations of the resources within the time-frequency resource pool and communicating with one or more other UEs in the sidelink communications system based on the RRS.

A non-transitory computer-readable medium storing code for wireless communication at a UE in a sidelink communications system is described. The code may include instructions executable by a processor to determine a resource reservation signal (RRS) that indicates resources of a time-frequency resource pool available for sidelink communications for a transmission, the RRS indicating multiple sizes of an allocation of the resources and multiple locations of the resources within the time-frequency resource pool and communicate with one or more other UEs in the sidelink communications system based on the RRS.

In some examples of the method, apparatuses, and non-transitory computer-readable medium described herein, the RRS includes reservations for a number of transmissions, and a size of the RRS increases in proportion to a number of transmissions being reserved. In some examples of the method, apparatuses, and non-transitory computer-readable medium described herein, the size of the allocation of the resources includes one or more of a number of resource blocks (RBs), subchannels, or a number of transmission time intervals (TTIs) of the allocation of the resources. In some examples of the method, apparatuses, and non-transitory computer-readable medium described herein, the location of the resources within the time-frequency resource pool includes one or more of a number of transmission time intervals (TTIs) from a transmission of the RRS to a start of the transmission, or a frequency bandwidth occupied by the transmission.

In some examples of the method, apparatuses, and non-transitory computer-readable medium described herein, a transmission of the RRS includes a control channel transmission and a RRS payload, and where the control channel transmission indicates a size of the RRS payload. In some examples of the method, apparatuses, and non-transitory computer-readable medium described herein, a number of reservations of resources of the time-frequency resource pool may be limited to a predetermined maximum value. In some examples of the method, apparatuses, and non-transitory computer-readable medium described herein, the number of reservations is indicated through a RRS control channel transmission.

In some examples of the method, apparatuses, and non-transitory computer-readable medium described herein, the RRS indicates reservations for multiple different transmissions of multiple different services of a sidelink UE. In some examples of the method, apparatuses, and non-transitory computer-readable medium described herein, the number of different transmissions for which reservations are made is indicated through a RRS control channel transmission.

In some examples of the method, apparatuses, and non-transitory computer-readable medium described herein, the RRS further indicates a semi-persistent reservation of resources within the time-frequency resource pool, and where the semi-persistent reservation provides one or more of a periodicity of the reservation of resources, a duration of the reservation of resources, or combinations thereof. In some examples of the method, apparatuses, and non-transitory computer-readable medium described herein, the RRS indicates a reservation of resources for a RRS transmission. In some examples of the method, apparatuses, and non-transitory computer-readable medium described herein, the RRS may be ignored by the UE based on the UE having no scheduled transmissions using the time-frequency resource pool for a predetermined period of time. In some examples, a UE may not decode an RRS for some time, and may wait for a predetermined time period (e.g., a maximum time period for which resources may be reserved) before it transmits on the resources.

Some examples of the method, apparatuses, and non-transitory computer-readable medium described herein may further include operations, features, means, or instructions for determining resources in a time-frequency resource pool based at least in part on available resources that are unreserved by other RRS transmissions, dedicated resources for RRS transmissions, randomly select from within the determined set of candidate resources, resources for transmission of RRS based on a priority of a transmission associated with the RRS, or any combinations thereof.

DETAILED DESCRIPTION

Figure 1:
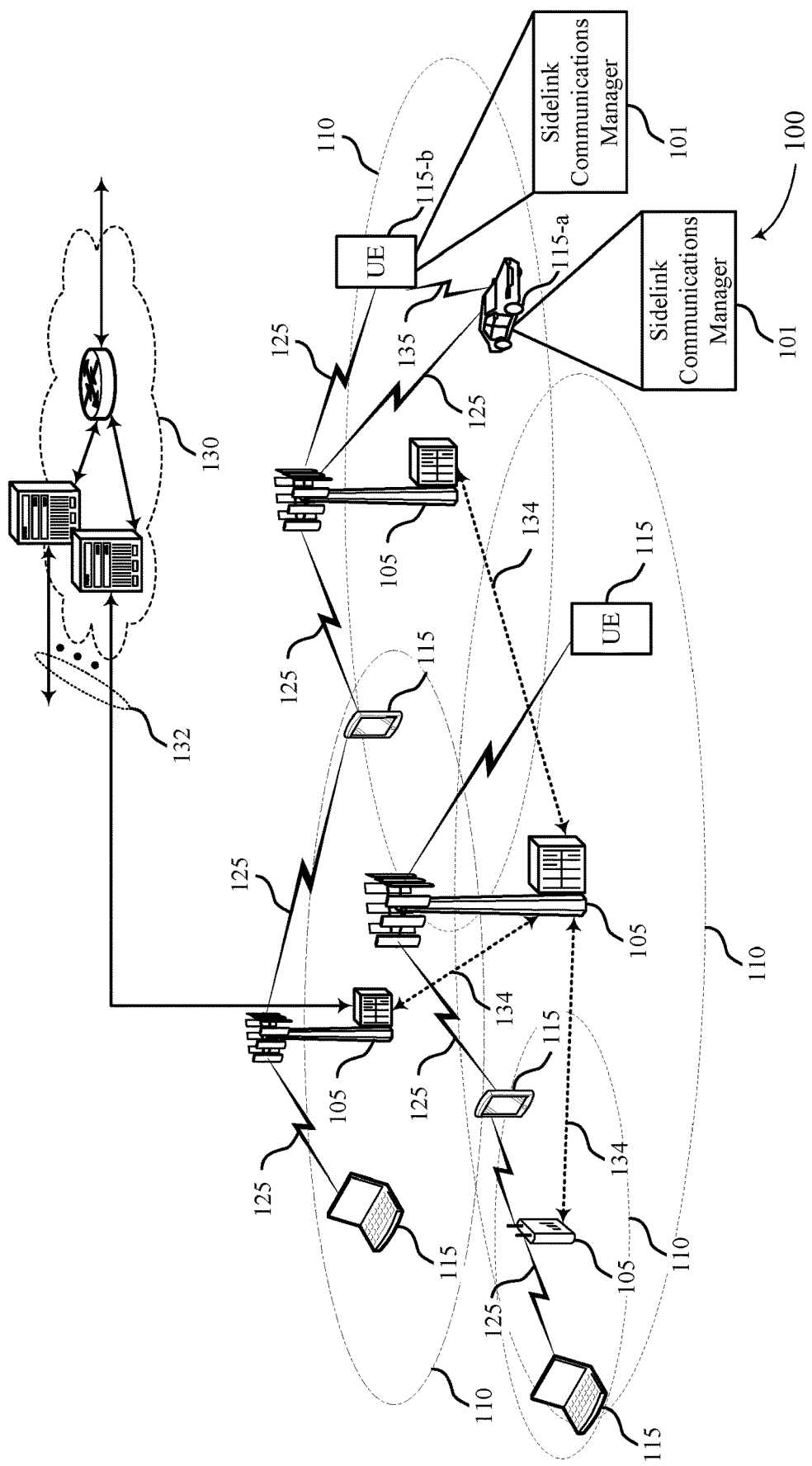
FIG. 1 illustrates an example of a system for wireless communications that supports resource reservation techniques for sidelink communications in accordance with aspects of the present disclosure.

Wireless communications devices operating in a sidelink communications system (e.g., vehicle-to-everything (V2X) system, a vehicle-to-vehicle (V2V) system, a cellular V2X (C-V2X) system, each of which may be referred to interchangeably as V2V or V2X herein) may communicate with each other using the same frequency band. For example, a user equipment (UE) within a V2X system may attempt to receive communications from one or more neighboring UEs in order to maintain accurate system information (e.g., to receive data for autonomous driving applications). Additionally, a UE in a V2X or sidelink system may operate according to a half-duplex mode during reception and/or transmission of data, where the UE may be unable to concurrently transmit and receive data. According to various aspects of the disclosure, a V2X or sidelink system may employ a dynamic resource scheduling scheme to utilize available time-frequency resources and also transmit resource reservation signals (RRSs) that reserve resources for upcoming transmissions of a UE.

For example, a UE within a V2X or sidelink system may decode an RRS from another UE within the system and obtain information regarding one or more upcoming transmission of the other UE. In some cases, a UE may maintain a resource map containing information regarding occupied resources, and may use this map to select resources for its own transmissions (e.g. data transmissions), RRS transmissions or both. A resource map may be maintained at each UE individually and may be updated as reservation from other UEs are received. According to some aspects, RRS transmissions may be differentiated from other regular V2X or sidelink transmissions based at least in part on information provided by a control channel associated with the RRS or a payload of a transmission that includes the RRS. For example, a control channel transmission may be provided by each UE as part of a transmission, and may indicate whether the particular transmission includes a RRS or V2X or sidelink data.

In some cases, different encoding schemes may be used for RRS transmissions and V2X or sidelink transmissions, and a UE may determine the content of a transmission based on decoding control information according to different blind decoding hypotheses that are associated with RRS transmissions and transmissions. In some cases, the control information for V2X or sidelink transmissions may include multiple parts, including a first part (e.g., a first symbol) that is common to RRS transmissions and V2X or sidelink transmissions and a second part (e.g., one or more additional symbols) that may be used for V2X or sidelink transmission but not RRS transmissions. In such cases, the first part may provide an indication of whether the transmission is an RRS transmission. In other cases, an initial symbol of a transmission slot may be used to allow receive circuitry at a second device to properly switch and acquire signals, and a predetermined bit sequence may be transmitted in such an initial symbol that may be used on indicate a RRS transmission or V2X or sidelink transmission. In further cases, RRS information may be included in a data portion of a V2X or sidelink transmission, and a UE may determine the presence of the RRS based on, for example, a medium access control (MAC) control element (MAC-CE) in the V2X or sidelink transmission.

In some cases, the RRS may indicate a one or more size of an allocation of the resources and multiple locations of the resources within a time-frequency resource pool. For example, the RRS may indicate a number of resource blocks (RBs) or subchannels that are being reserved for the upcoming transmission, a number of transmission time intervals (TTIs) of the upcoming transmission, or combinations thereof. In some cases, a location of the reserved allocation may provide time information (e.g., a number of TTIs from the transmission of the RRS), a frequency location of the reserved resource (e.g., a number of RBs or sub-channels and corresponding location from a start of the resource pool), or combinations thereof. Such RRS techniques may enable a UE in a V2V/V2X or sidelink system (or other systems) to reliably and dynamically select resources for varying packet sizes in both periodic and aperiodic communications.

Based on the resources reserved by other UEs, a UE that receives one or more RRSs may determine resources to utilize for transmission (e.g., based on a resource avoidance mechanism involving random selection or earliest available resources, among other factors).

Particular aspects of the subject matter described herein may be implemented to realize one or more advantages. The described techniques may support improvements in scheduling resources for sidelink communications, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects are then described with respect to RRS determination and content of RRS transmissions. Aspects of the disclosure are further illustrated by and described with reference to apparatus diagrams, system diagrams, and flowcharts that relate to resource reservation techniques for vehicle-to-vehicle or sidelink communications.

FIG. 1 illustrates an example of a wireless communications system 100 that supports autonomous resource selection techniques for sidelink communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a first device (e.g., a base station 105) and a second device (e.g., a UE 115), where the first device is equipped with multiple antennas and the second device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the first device via different antennas or different combinations of antennas. Likewise, the multiple signals may be received by the second device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same second device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a first device or a second device (e.g., a base station 105 or a UE 115) to shape or steer an antenna beam (e.g., a transmit beam or receive beam) along a spatial path between the first device and the second device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a first device or a second device applying amplitude and phase offsets to signals carried via each of the antenna elements associated with the device. The adjustments associated with each of the antenna elements may be defined by a beamforming weight set associated with a particular orientation (e.g., with respect to the antenna array of the first device or second device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may support V2V/V2X or sidelink communications among one or more UEs 115, such as UE 115-a and UE 115-b which may have a direct connection via link 135, which may be a sidelink connection or V2V/V2X connection. In such cases, each such UE 115 may include a V2X or sidelink communications manager 101 that may manage V2X or sidelink communications. In some cases, the V2X or sidelink communications manager may determine an upcoming transmission and transmit a RRS to reserve resources for the upcoming, future transmission, that may indicate a selection of resources that are intended to be used for the future transmission. In some cases, the RRS may be transmitted in such a manner that the RRS may be differentiated from other regular transmissions (e.g., V2X or sidelink transmissions) based at least in part on information provided by a control channel associated with the RRS or a payload of a transmission that includes the RRS. In some cases, the RRS may indicate one or more of a size of an allocation of the future resources, a location of the future resources within a time-frequency resource pool, or any combination thereof.

Figure 2:
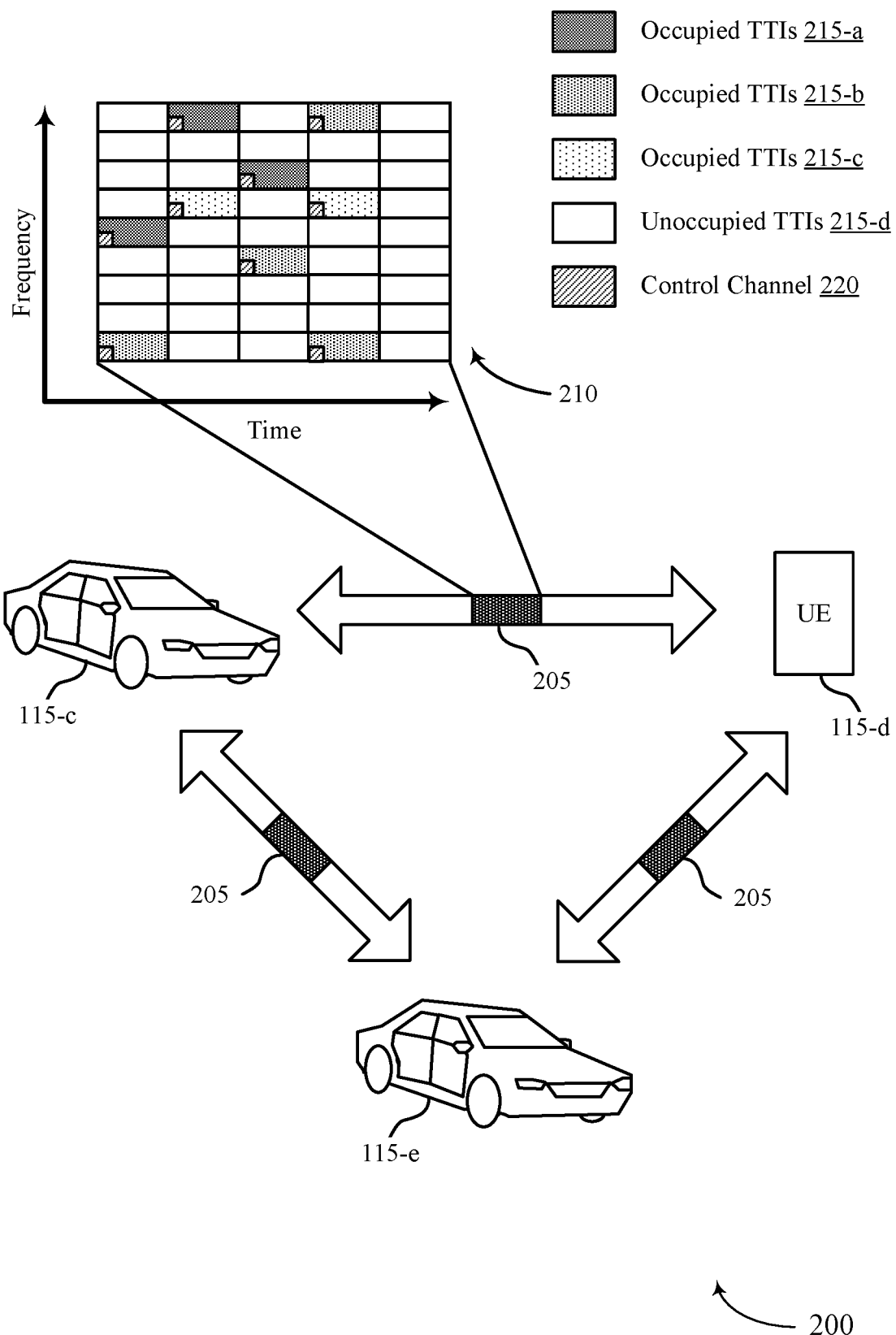
FIG. 2 illustrates an example of a wireless communications system that supports resource reservation techniques for sidelink communications in accordance with aspects of the present disclosure.

FIG. 2 illustrates an example of a wireless communications system 200 that supports resource reservation techniques for sidelink communications in accordance with aspects of the present disclosure. In some examples, wireless communications system 200 may implement aspects of wireless communications system 100. In some examples, wireless communications system 200 may implement aspects of wireless communications system 100 and may include UEs 115-c, 115-d, and 115-e, which may be examples UE 115 described with reference to FIG. 1. In some cases, UEs 115-c, 115-d, and 115-e may communicate with each other within a V2X or sidelink system (e.g., using sidelink communications 205) and may employ a resource scheduling interference avoidance scheme (e.g., autonomous resource selection scheme with interference avoidance) to dynamically select and use transmission resources.

According to some aspects, UE 115-c may attempt to decode sidelink transmissions 205 from UEs 115-d and 115-e in order to maintain accurate system information (vehicle data, scheduled resources, etc.) and construct a resource map 210 for a time-frequency resource pool that is configured for V2X or sidelink communications. In some cases, sidelink transmissions 205 may include a control channel 220, which UE 115-c may decode to determine which resources within the V2X or sidelink frequency channel are reserved or occupied by UEs 115-d and 115-e, respectively. In some examples, transmissions on a control channel 220 may indicate whether a transmission includes an RRS or V2X or sidelink data, as will be discussed in more detail with respect to FIGS. 3 through 7. Additionally, UE 115-c may use current and previous reservation information to construct a resource map 210, which may indicate resources (e.g., TTIs 215-a, 215-b, and 215-c) that are occupied by UEs 115-c, 115-d, and 115-e, respectively, and may also indicate unoccupied resources (e.g., unoccupied TTIs 215-d). In some cases, UE 115-c may use resource map 210 to select resources (e.g., one or more TTIs 215) to use for its own sidelink transmissions 205, which may also be selected based on an interference avoidance scheme.

In some cases, control channel 220 information for V2X or sidelink transmissions require about three symbols and up to about 10 RBs (for approximately 64 bits of information to be communicated in some examples), and includes UE identification, protection range, priority information, etc. Further, control channel 220 information for RRS may require fewer resources, such as one symbol, since there is no actual data being transmitted and just reservation information that may have a predetermined modulation and code rate that correspond to a size the resource occupied by the RRS (e.g., there may be a specified one-to-one mapping of RRS resource size and MCS). In other cases, the RRS size may be explicitly signaled as part the control channel 220.

In some cases, different encoding schemes for control information may be used for RRS transmissions and V2X or sidelink transmissions, and a UE (e.g., UE 115-d that may receive a RRS from UE 115-c) may determine the content of a transmission based on decoding control information according to different blind decoding hypotheses that are associated with RRS transmissions and transmissions. In some cases, the control channel 220 may include multiple parts, including a first part (e.g., a first symbol) that is common to RRS transmission and V2X or sidelink transmissions and a second part (e.g., one or more additional symbols) that may be used for V2X or sidelink transmission but not RRS transmissions. In such cases, the first part may provide an indication of whether the transmission is an RRS transmission. In other cases, an initial symbol of a transmission slot may be used to allow receive circuitry at a second device to properly switch and acquire signals, and a predetermined bit sequence may be transmitted in such an initial symbol that may be used on indicate a RRS transmission or V2X or sidelink transmission. In further cases, RRS information may be included in a data portion of a V2X or sidelink transmission, and a UE may determine the presence of the RRS based on, for example, a MAC-CE in the V2X or sidelink transmission.

In some cases, the RRS may indicate one or more of a size of an allocation of the future resources and multiple locations of the future resources within a time-frequency resource pool. For example, the RRS may indicate a number of RBs (or sub-channels) that are being reserved for the upcoming transmission, a number of TTIs of the upcoming transmission, or combinations thereof. In some cases, a location of the reserved allocation may provide time information (e.g., a number of TTIs from the transmission of the RRS), a frequency location of the reserved allocation (e.g., a number of RBs or sub-channels and corresponding location from a start of the resource pool), or combinations thereof.

When initiating a transmission, UE 115-c, for example, may begin selecting transmission resources by defining a window for resource selection within the V2X or sidelink transmission resources (e.g., using resource map 210). Within the defined window, UE 115-c may select one or more resources 215 for transmission by determining one or more candidate resources 215. For example, UE 115-c may use resource map 210 to determine resources 215-b (e.g., resources occupied by UE 115-d) and resources 215-c (e.g., resources occupied by UE 115-e) and may determine to exclude these resources from selection based on the resources being occupied. Additionally or alternatively, UE 115-c may determine candidate resources 215 based on a distance between UE 115-c and either UE 115-d or 115-e. For example, if UE 115-e has reserved resources 215-c, but UE 115-e is beyond a threshold distance from UE 115-c (e.g., as indicated in a transmission on a control channel 220), UE 115-c may determine resources 215-c as candidate resources. In some cases, UE 115-c may also determine candidate resources 215 based on a latency requirement of a data packet to be sent. For example, UE 115-c may have a latency threshold requirement and may determine resources 215 that satisfy the requirement.

In some examples, UE 115-c may select resources based on a hierarchy of rules (e.g., an interference avoidance scheme) and candidate resources determined using resource map 210. In some cases, UE 115-c may first attempt to randomly select an unoccupied resources 215-d that may not coincide in time with any other reserved resources 215-a, 215-b, or 215-c (e.g., in order to avoid half duplex effects). For example, UE 115-c may select an unoccupied resources 215-d from the last column (e.g., right-hand column) of resource map 210 or from another column that may include unoccupied resources 215-d. Additionally or alternatively, an earlier unoccupied resources 215-d may be preferred over a later unoccupied resources 215-d (e.g., instead of the selection process being completely random). For example, in some cases, UE 115-c may select the earliest unoccupied resources 215-d that does not coincide in time with another resources 215-d.

In some cases, UE 115-c may be unable to transmit on or unable to find an unoccupied resources 215-d that does not coincide in time with other transmissions. Therefore, UE 115-c may proceed to select unoccupied resources 215-d that may be multiplexed in frequency with retransmissions from UE 115-d or 115-e, where the retransmissions may correspond to original transmissions that UE 115-c may have successfully decoded. For example, UE 115-c may determine (e.g., from decoding a control channel 220) that resources 215-b and 215-c within the second-to-last column of resource map 210 are retransmissions, and may further determine that UE 115-c has already successfully decoded the original transmissions corresponding to the retransmissions. As such, UE 115-c may proceed to select an unoccupied resources 215-d within the second-to-last column of resource map 210.

Additionally or alternatively, UE 115-c may be unable to transmit on or unable to find an unoccupied resources 215-d after attempting the above techniques. Therefore, UE 115-c may determine to randomly select any unoccupied resources 215-*d* of the appropriate size for its own transmissions. Additionally or alternatively, UE 115-*c* may determine to preempt resources of a lower priority, where the resource priority may be determined from decoding a control channel 220. For example, UE 115-*c* may determine to preempt one or more resources 215-*b* for its own transmissions and may indicate this intention in a control channel 220 associated with the transmissions. As such, UE 115-*d* may decode the control channel 220 transmitted by UE 115-*c* (e.g., as part of constructing a resource map 210), may determine that UE 115-*c* is preempting resources on one or more resources 215-*b*, and may release the preempted resources. In some cases, UE 115-*c* may determine lower priority resources for preemption based on a signal strength (e.g., received signal strength indicator (RSSI), reference signal received power (RSRP)) of the transmissions corresponding to the resources. For example, UE 115-*c* may determine transmissions with a lower signal strength as lower priority (e.g., because the low signal strength may indicate the first device may be located beyond a certain distance from UE 115-*c*).

Figure 3:
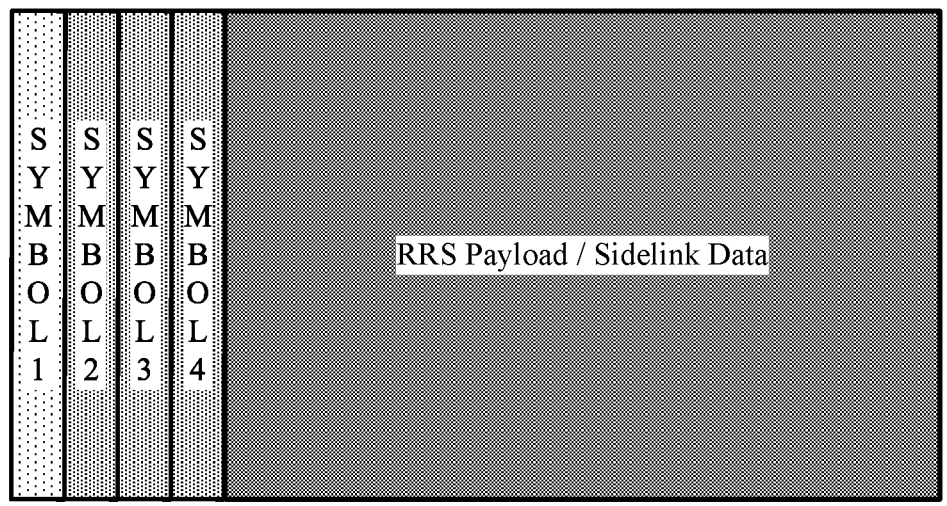
FIGS. 3 through 6 illustrate examples of sidelink communications that support resource reservation techniques for sidelink communications in accordance with aspects of the present disclosure.
Figure 3:
Figure 3:
Figure 3:

FIG. 3 illustrates an example of a sidelink communication 300 that supports resource reservation techniques for sidelink communications in accordance with aspects of the present disclosure. In some examples, V2V or sidelink communication 300 may implement aspects of wireless communications system 100 or 200. In this example, V2V or sidelink communications may occupy a number of symbols within a TTI. In some cases, a first symbol may act as a guard period 305 that may allow for receive circuit switching and settling. For example, automatic gain control (AGC) of a receive circuit may use the first symbol to come to a steady state, which may allow more reliable reception of transmissions.

In this example, a second through fourth symbol may include control information 310, which may be control information for V2V or sidelink transmissions, or control information for RRS transmissions, and the control information 310 may explicitly indicate whether it is for RRS. Following the control information 310, may be an RRS payload or V2V or sidelink data 315, depending on whether the control information 310 indicates that the V2V or sidelink communication 300 is an RRS transmission or a V2V or sidelink transmission.

In some cases, the control information 310 may be encoded differently based on whether the V2V or sidelink communications includes an RRS transmission or a V2V or sidelink transmission. For example, a UE receiving the information may perform a number of decodes on the control information 310 according to a number of blind decoding hypotheses. In some cases, different subsets of blind decoding hypotheses may be associated with RRS transmissions and V2V or sidelink transmissions. Upon successfully decoding the control information 310, the UE may determine whether the V2V or sidelink communication 300 includes a RRS or V2V or sidelink data based on whether the successful decoding candidate was associated with RRS or V2V or sidelink data.

Figure 4:
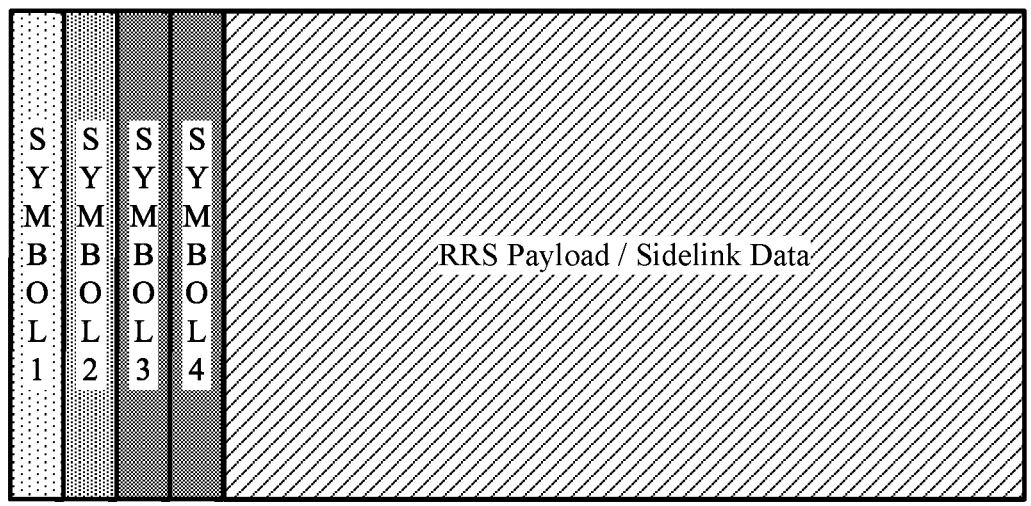
Figure 4:
Figure 4:
Figure 4:
Figure 4:

FIG. 4 illustrates another example of a sidelink communication 400 that supports resource reservation techniques for sidelink communications in accordance with aspects of the present disclosure. In some examples, sidelink communication 400 may implement aspects of wireless communications system 100 or 200. In this example, V2V or sidelink communications may again occupy a number of symbols within a TTI, with a first symbol that may act as a guard period 405 that may allow for receive circuit switching and settling. For example, AGC of a receive circuit may use the first symbol to come to a steady state, which may allow more reliable reception of transmissions.

In this example, a second symbol may include part 1 control information 410, and the third symbol and fourth symbol may include part 2 control information 415. In this example, part 1 control information 410 may be common to both V2V or sidelink transmissions and RRS transmissions, and part 2 control information 415 may be specific to V2V or sidelink transmissions. Following the control information 410 and 415, may be an RRS payload or V2V or sidelink data 420, depending on whether the part 1 control information 410 indicates that the sidelink communication 400 is an RRS transmission or a V2V or sidelink transmission.

In some cases, the part 1 control information 410, as indicated above, may be common to both V2V or sidelink and RRSs transmissions. The part 1 control information 410 may, in some cases, include a bit that indicates whether the sidelink communication 400 is a RRS or V2V or sidelink transmission. The part 1 control information 410 may also indicate one or more of an RRS size (if the RRS bit indicates an RRS transmission), a size of the allocation (if the RRS bit indicates a V2V or sidelink transmission), a DMRS structure, and the like. In some cases, the part 1 control information 410 may also include a UE identification of the UE, a protection range, priority information for the transmission, and the like. In some cases, the part 1 control information 410 may also be limited in size to fit an allocation of one symbol. In some cases, the part 2 control information 415 may include, control information specific to transmissions, such as a transmission rank, MCS, transmission mode, retransmission number, scheduling for retransmissions, and the like. A UE receiving the information may decode the part 1 control information 410 and determine whether to decode the part 2 control information 415 accordingly. In some cases, the part 1 control information 410 may have an associated CRC, although in some cases it may not have any CRC to help reduce overhead. In some cases, the part 1 control information 410 may be transmitted in any RBs and a UE may perform multiple decodes to figure out the location in frequency, and the part 2 control information 415 may be transmitted within the sub-channel boundaries of the part 1 control information 410.

Figure 5:
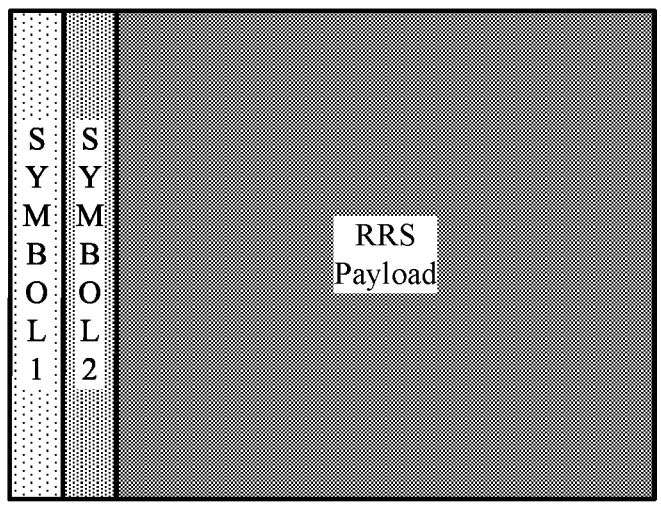
Figure 5:
Figure 5:
Figure 5:

FIG. 5 illustrates an example of a sidelink communication 500 that supports resource reservation techniques for sidelink communications in accordance with aspects of the present disclosure. In some examples, sidelink communication 500 may implement aspects of wireless communications system 100 or 200. In this example, sidelink communications may again occupy a number of symbols within a TTI, with a first symbol that may act as a guard period 505 that may allow for receive circuit switching and settling. For example, AGC of a receive circuit may use the first symbol to come to a steady state, which may allow more reliable reception of transmissions. In this example, a second symbol may include RRS control information 510, which may be followed by an RRS payload 515.

In this example, the guard period 505 may also include a predetermined bit sequence that may be transmitted and that is associated with a RRS transmission. In some cases, a different predetermined bit sequence may be used for V2V or sidelink transmissions than for RRS transmissions, and may be transmitted in the first symbol. In such cases, for RRS transmissions, the control information 310 may span a single symbol, and thus such transmissions may use less overhead relative to cases that provide three symbols of control information.

Figure 6:
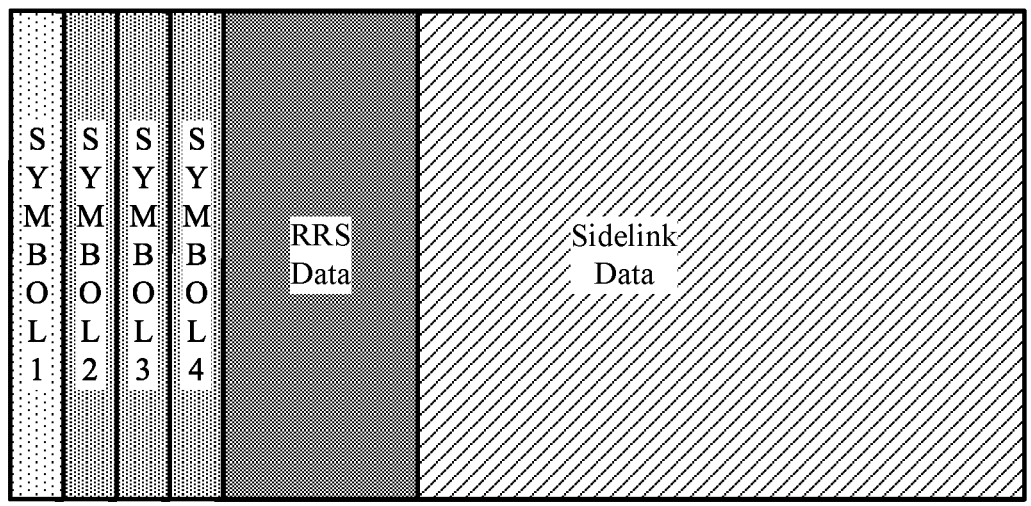
Figure 6:
Figure 6:
Figure 6:
Figure 6:
Figure 6:

FIG. 6 illustrates an example of a sidelink communication 600 that supports resource reservation techniques for sidelink communications in accordance with aspects of the present disclosure. In some examples, sidelink communication 600 may implement aspects of wireless communications system 100 or 200. In this example, V2V or sidelink communications may again occupy a number of symbols within a TTI, with a first symbol that may act as a guard period 605 that may allow for receive circuit switching and settling. For example, AGC of a receive circuit may use the first symbol to come to a steady state, which may allow more reliable reception of transmissions. In this example, RRS information may be included with a regular V2V or sidelink transmission, and control information 610 may span three symbols. In this example, RRS data 615 may follow the control information 610, and V2V or sidelink data 620 may follow the RRS data 615.

Thus, in this example, RRS can be signaled as part of normal V2V or sidelink transmissions (e.g., data transmissions that may have been reserved in the past or transmitted without reservations). In some cases, the RRS data 615 may be included in an initial part of the V2V or sidelink transmission following control information 610, and may include a MAC-CE that indicated RRS information. In some cases, the MCS/spectral efficiency (SE) of the RRS data 615 may be equal to or lower than the V2V or sidelink data 620, in order to provide enhanced reliability for the RRS data. In some cases, the MCS/SE of the RRS may be a fixed value or configured (e.g., via radio resource control (RRC) signaling).

In any of the examples of FIGS. 3 through 6, the of the RRS, which may be referred to as the RRS payload, may indicate resources that are reserved by the UE for an upcoming transmission. In some cases, the RRS may include reservations for a number of transmissions ("n"), and a size of the RRS may increase in proportion to the number of transmissions being reserved. In some cases, the RRS contains a size of the allocation being reserved (e.g., in a fixed number of bits), a location of the reserved allocation (e.g., in a variable number of bits depending on "n"), or both. In some cases, the size of the allocation being reserved may include one or more of a number of RBs, a number of TTIs, or combinations thereof.

In some cases, the location of the reserved resource may include one or more of a time location (e.g., a number of TTIs from the transmission of the RRS, which can also vary depending on the latency constraints), a frequency location (e.g., a number of RBs or sub-channels from the start of the resource pool), or combinations thereof. In some cases, the frequency location depends upon the bandwidth available for V2V or sidelink transmissions, and in some cases the control channel of the RRS may also indicate the size of the time/frequency resources and also "n". Such information may assist a UE in decoding the RRS. Further, in some cases, a resource occupancy (number of RBs) can also vary depending on the size ("n") contained in the RRS, to help ensure a relatively low code rate and improved RRS decoding.

In some cases, a number of reservations for a particular UE may be limited to a maximum value (T) (e.g., T could be set to 2 or 4 to ensure fairness among all UEs). In some cases, the RRS may indicate the number of reservations of a UE. Additionally or alternatively, the RRS may indicate reservations for multiple packets, in cases where multiple packets arrive at the same time at the UE, and a RRS format may indicates reservations one packet at a time, in a serial manner. Additionally or alternatively, the RRS may also indicate whether the reservation is semi-persistent, and may have a defined periodicity that is indicated as part of the reservation, and may also indicate a specified duration for which the reservation is valid. Further, in some cases, the RRS may also reserve resources for another RRS in in anticipation of more packet arrivals or to meet strict latency constraints. In some cases, if a UE is not planning to perform transmissions for a threshold time period (e.g., 2 ms) then it may be allowed to not decode RRS and directly decode the actual transmission. In such cases, if a UE does not decode reservation signals for some time, it may have to wait for a predetermined time period (e.g., a maximum time period for which resources may be reserved) before it can transmit on a certain resource.

Figure 7:
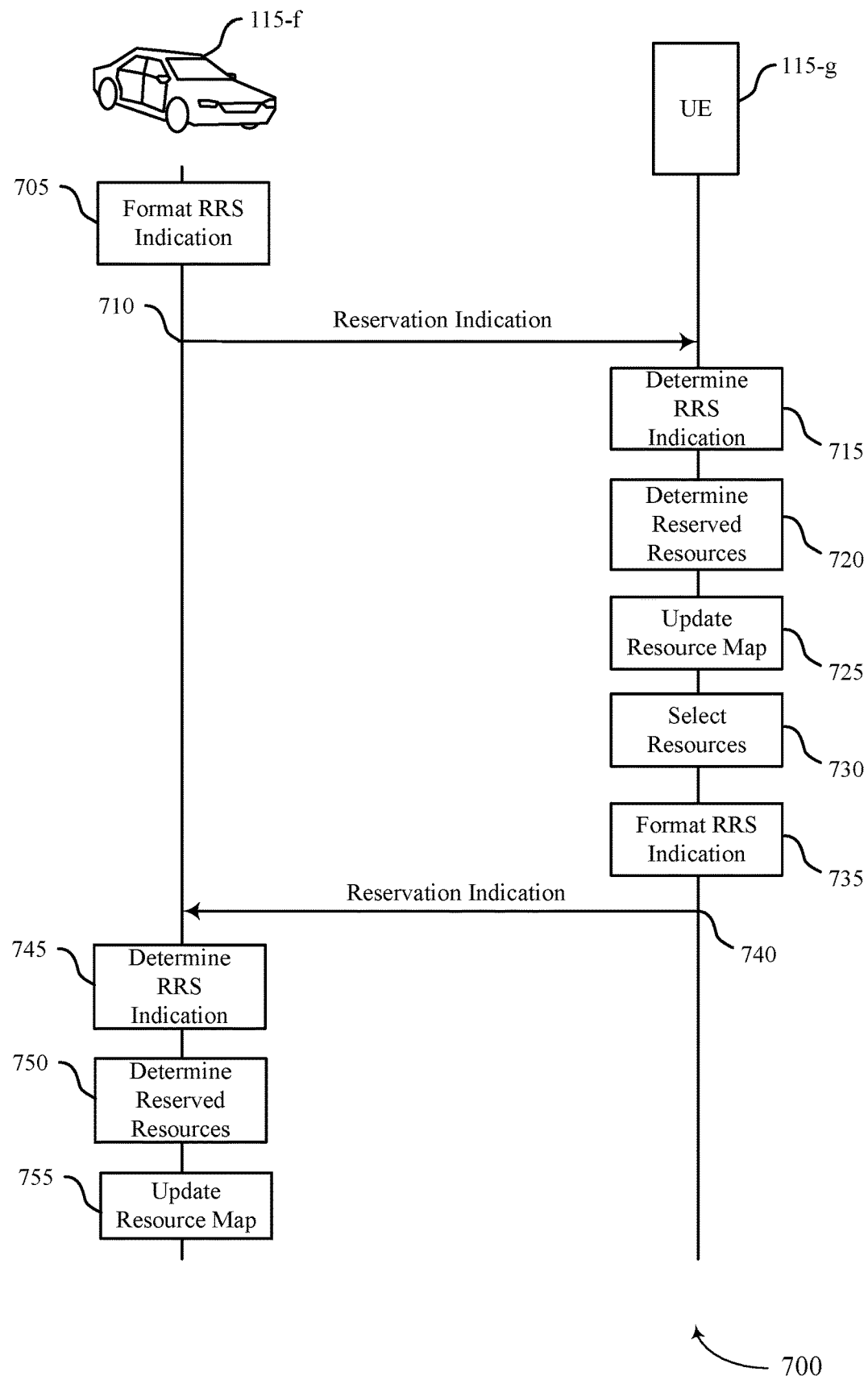
FIG. 7 illustrates an example of a process flow that supports resource reservation techniques for sidelink communications in accordance with aspects of the present disclosure.

FIG. 7 illustrates an example of a process flow 700 that supports resource reservation techniques for sidelink communications in accordance with aspects of the present disclosure. In some examples, process flow 700 may implement aspects of wireless communications system 100 or 200. Process flow 700 may be implemented by UE 115-*f* and 115-*g*, which may be examples of UEs 115, as described herein.

At 705, UE 115-*f* format an RRS indication. The RRS indication may be formatted based on one or more control information formats as discussed with in FIGS. 3 through 6, for example.

At 710, UE 115-*f* may transmit, to UE 115-*g*, a control transmission containing a reservation indication. A reservation indication may be an example of a RRS described in FIGS. 2 through 6. In some cases, a reservation indication may be transmitted over a resource being reserved by UE 115-*f*.

At 715, UE 115-*g* determine the RRS indication. In some cases, the RRS indication may be determined based on control information or data that is transmitted by the UE 115-*f* as described in FIGS. 3 through 6.

At 720, the UE 115-*g* may determine reserved resources that are indicated by the UE 115-*f* In some cases, at 725, UE 115-*g* may update a resource map based on the RRS received from UE 115-*f* A resource map may be an example of resource map 210 described in FIG. 2. For example, UE 115-*g* may decode the control transmission and determine that an RRS is transmitted, determine the information in the RRS, and may update the resource map accordingly.

At 730, UE 115-*g* may select resources in accordance with a resource avoidance mechanism. The resource avoidance mechanism may be an example of resource avoidance mechanism described in FIG. 2. At 735, the UE 115-*g*, based on the selected resources, may format a RRS indication to be transmitted to UE 115-*f*, and one or more other UEs that may be present in a V2V or sidelink network. At 740, the UE 115-*g* may transmit reservation indication in a RRS.

At 745, UE 115-*f* determine the RRS indication from UE 115-*g*. In some cases, the RRS indication may be determined based on control information or data that is transmitted by the UE 115-*g* as described in FIGS. 3 through 6.

At 750, the UE 115-*f* may determine reserved resources that are indicated by the UE 115-*g*. In some cases, at 755, UE 115-*g* may update a resource map based on the RRS received from UE 115-*g* (e.g., as described in FIG. 2). For example, UE 115-*f* may decode the control transmission and determine that an RRS is transmitted, determine the information in the RRS, and may update the resource map accordingly.

Figure 8:
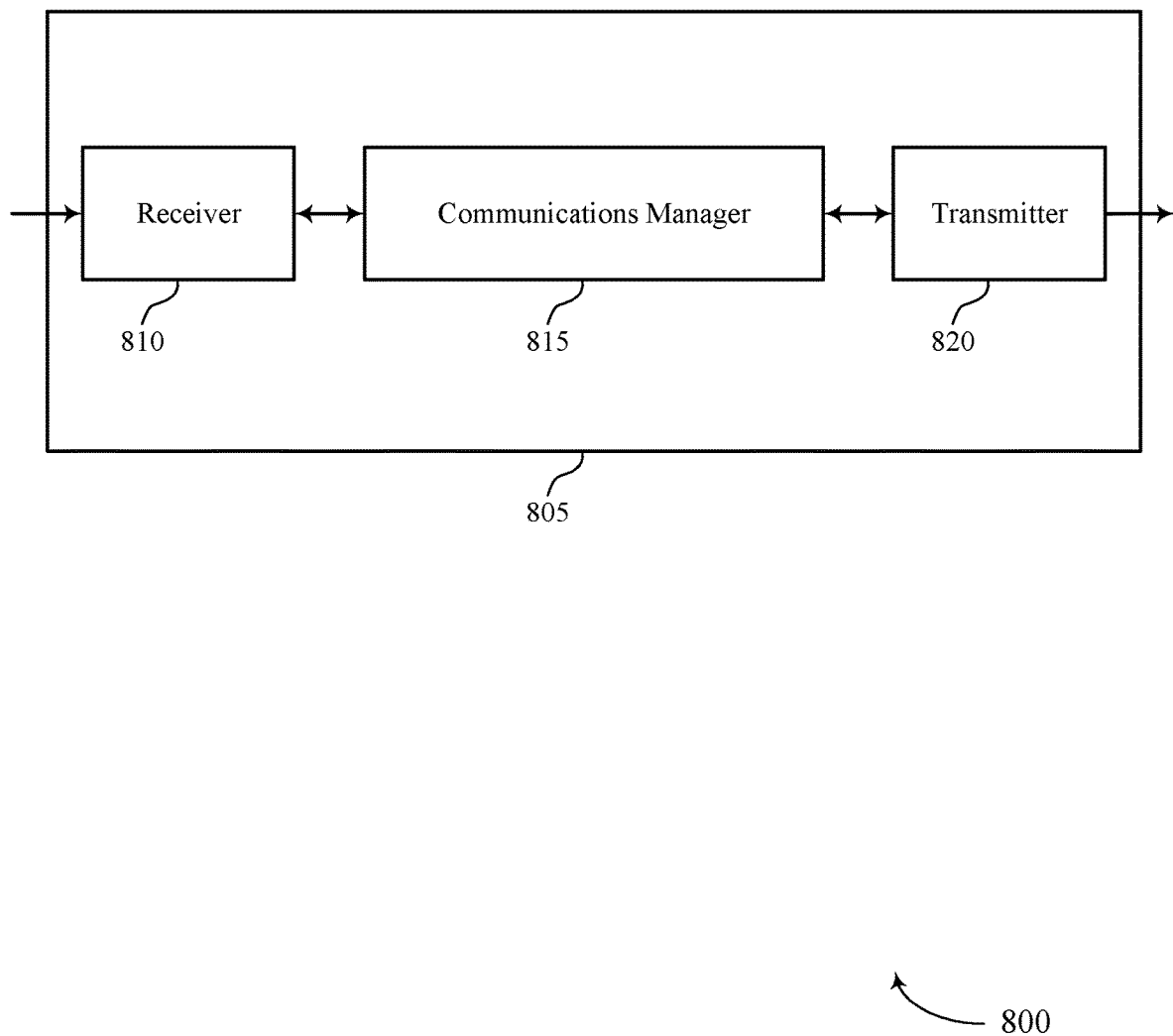
FIGS. 8 and 9 show block diagrams of devices that support resource reservation techniques for sidelink communications in accordance with aspects of the present disclosure.

FIG. 8 shows a block diagram 800 of a device 805 that supports resource reservation techniques for sidelink communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to resource reservation techniques for vehicle-to-vehicle or sidelink communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine a time-frequency resource pool that provides wireless resources available for V2V or sidelink communications, receive a first transmission from a UE in the V2V or sidelink communication system via a subset of resources of the time-frequency resource pool, and determine, based on information provided by one or more of a control channel associated with the first transmission or a payload of the first transmission, whether the first transmission contains a resource reservation signal (RRS) that indicates resources of the time-frequency resource pool or a transmission of the UE (e.g. data transmissions).

The communications manager 815 may also determine a time-frequency resource pool that provides wireless resources available for V2V or sidelink communications, select resources of the time-frequency resource pool for transmitting the transmission, determine that a transmission to one or more UEs in the V2V or sidelink communication system is to be transmitted, format a resource reservation signal (RRS) that indicates a reservation of the resources of the time-frequency resource pool into a first transmission, where an indication that the first transmission includes the RRS is provided in one or more of a control channel associated with the first transmission or a payload of the first transmission, and transmit the first transmission to the one or more UEs.

The communications manager 815 may also determine a resource reservation signal (RRS) that indicates resources of a time-frequency resource pool available for V2V or sidelink communications for a transmission, the RRS indicating one or more of a size of an allocation of the resources and multiple locations of the resources within the time-frequency resource pool and communicate with one or more other UEs in the V2V or sidelink communications system based on the RRS. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 may be implemented as an integrated circuit or chipset for a mobile device modem, and the receiver 810 and transmitter 820 may be implemented as analog components (e.g., amplifiers, filters, antennas) coupled with the mobile device modem to enable wireless transmission and reception over one or more bands.

The communications manager 815 as described herein may be implemented to realize one or more potential advantages. One implementation may allow the device 805 to determine a time-frequency resource pool, receive transmissions via resources of the time-frequency pool, and determine whether the transmissions contain an RRS that indicates available resources of the time-frequency pool. The RRS may indicate resources for transmissions which may increase reliability and reduce latency during sidelink transmissions.

Based on techniques for determining resources for transmissions as described herein, a processor of a UE 115 (e.g., controlling the receiver 810, the transmitter 820, or the transceiver 1120 as described with reference to FIG. 11) may increase reliability and decrease signaling overhead in sidelink communications because the UE 115 may avoid going through unnecessary configuration processes during transmissions.

Figure 9:
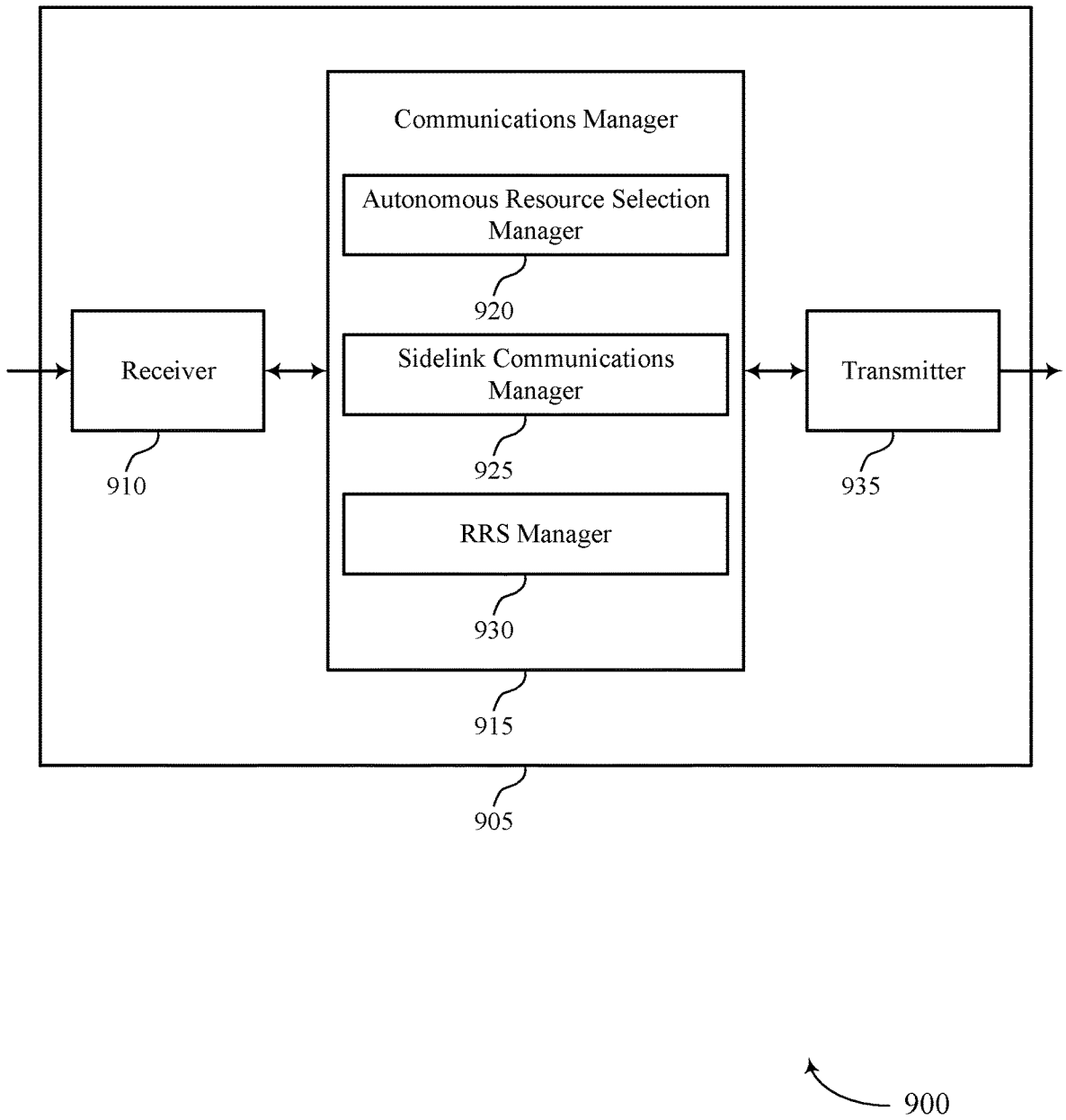

FIG. 9 shows a block diagram 900 of a device 905 that supports resource reservation techniques for sidelink communications in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to resource reservation techniques for vehicle-to-vehicle or sidelink communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an autonomous resource selection manager 920, a V2V or sidelink communications manager 925, and a RRS manager 930. The communications manager 915 may be an example of aspects of the communications manager 1110 described herein.

The autonomous resource selection manager 920 may determine a time-frequency resource pool that provides wireless resources available for V2V or sidelink communications. In some cases, the autonomous resource selection manager 920 may select resources of the time-frequency resource pool for transmitting the transmission.

The V2V or sidelink communications manager 925 may receive a first transmission from a UE in the V2V communication system via a subset of resources of the time-frequency resource pool. In some cases, the V2V or sidelink communications manager 925 may transmit the first transmission to the one or more UEs. In some case, the V2V or sidelink communications manager 925 may communicate with one or more other UEs in the V2V or sidelink communications system based on the RRS.

The RRS manager 930 may determine, based on information provided by one or more of a control channel associated with the first transmission or a payload of the first transmission, whether the first transmission contains a resource reservation signal (RRS) that indicates resources of the time-frequency resource pool or a transmission of the UE.

In some cases, the RRS manager 930 may determine that a transmission to one or more UEs in the V2V or sidelink communication system is to be transmitted and format a resource reservation signal (RRS) that indicates a reservation of the resources of the time-frequency resource pool into a first transmission, where an indication that the first transmission includes the RRS is provided in one or more of a control channel associated with the first transmission or a payload of the first transmission.

In some cases, the RRS manager 930 may determine a resource reservation signal (RRS) that indicates resources of a time-frequency resource pool available for V2V or sidelink communications for a transmission, the RRS indicating one or more of a size of an allocation of the resources and multiple locations of the resources within the time-frequency resource pool.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

In some examples, the communications manager 915 may be implemented as an integrated circuit or chipset for a mobile device modem, and the receiver 910 and transmitter 935 may be implemented as analog components (e.g., amplifiers, filters, antennas) coupled with the mobile device modem to enable wireless transmission and reception over one or more bands.

The communications manager 915 as described herein may be implemented to realize one or more potential advantages. One implementation may allow the device 805 to determine a time-frequency resource pool, receive transmissions via resources of the time-frequency pool, and determine whether the transmissions contain an RRS that indicates available resources of the time-frequency pool. The RRS may indicate resources for transmissions which may increase reliability and reduce latency during sidelink transmissions.

Based on techniques for determining resources for transmissions as described herein, a processor of a UE 115 (e.g., controlling the receiver 910, the transmitter 935, or the transceiver 1120 as described with reference to FIG. 11) may increase reliability and decrease signaling overhead in sidelink communications because the UE 115 may avoid going through unnecessary configuration processes during transmissions.

Figure 10:
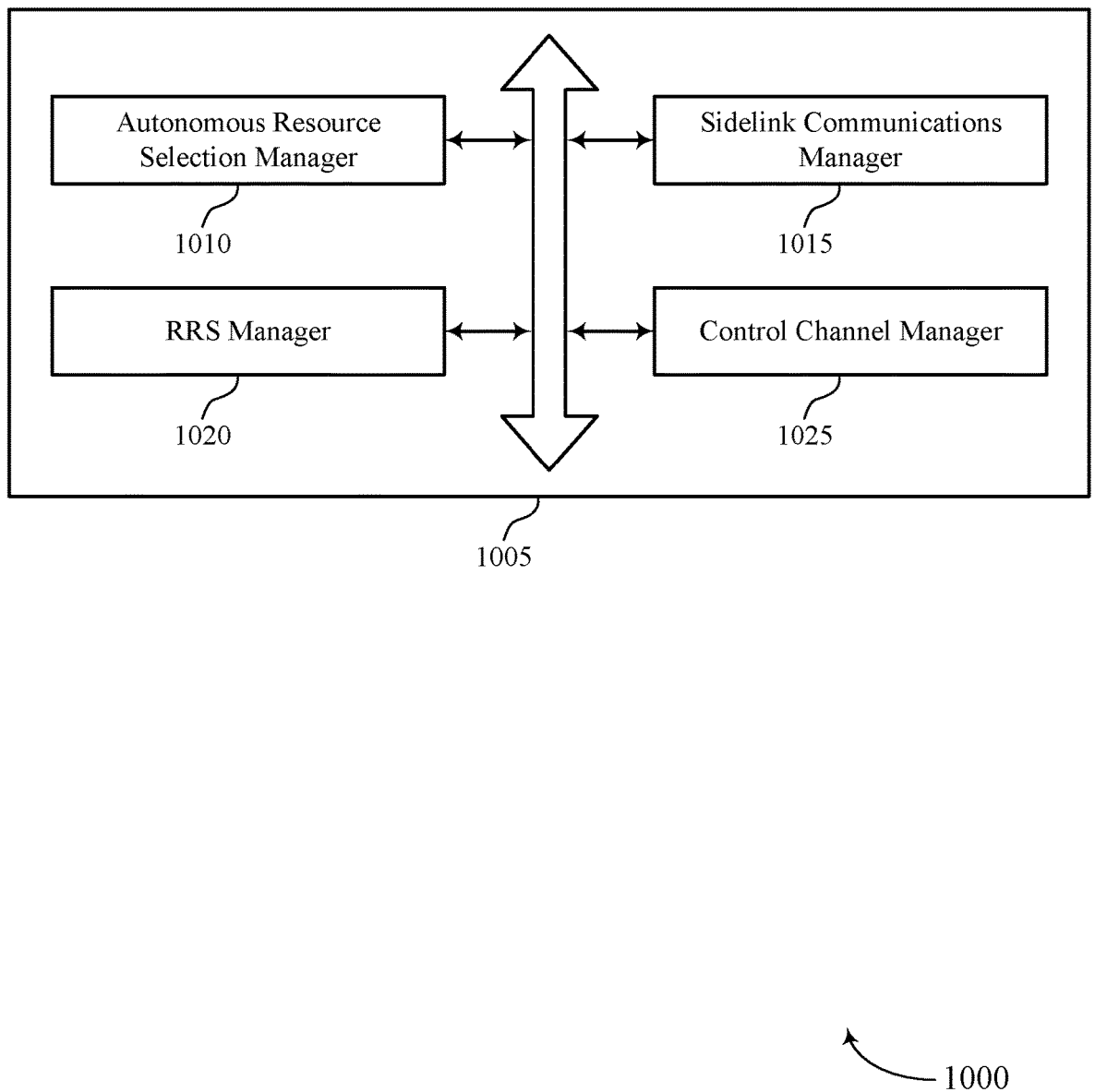
FIG. 10 shows a block diagram of a communications manager that supports resource reservation techniques for sidelink communications in accordance with aspects of the present disclosure.

FIG. 10 shows a block diagram 1000 of a communications manager 1005 that supports resource reservation techniques for sidelink communications in accordance with aspects of the present disclosure. The communications manager 1005 may be an example of aspects of a communications manager 815, a communications manager 915, or a communications manager 1110 described herein. The communications manager 1005 may include an autonomous resource selection manager 1010, a V2V or sidelink communications manager 1015, a RRS manager 1020, and a control channel manager 1025. Each of these modules may communicate, directly or indirectly, with one another (e.g., via one or more buses).

The autonomous resource selection manager 1010 may determine a time-frequency resource pool that provides wireless resources available for V2V or sidelink communications. In some examples, the autonomous resource selection manager 1010 may select resources of the time-frequency resource pool for transmitting of the transmission. In some examples, the autonomous resource selection manager 1010 may perform decoding on the first transmission based on the set of blind decoding hypotheses.

In some examples, the autonomous resource selection manager 1010 may determine resources for transmitting RRS, based at least in part on one or more of available resources that are unreserved by other RRS transmissions, dedicated resources for RRS transmissions, randomly selected resources from within the determined set of available candidate resources, resources for transmission of RRS based on a priority of a transmission associated with the RRS, or any combinations thereof.

In some cases, the size of the allocation of the resources includes one or more of a number of resource blocks (RBs) or a number of transmission time intervals (TTIs) of the allocation of the resources. In some cases, the location of the resources within the time-frequency resource pool includes one or more of a number of transmission time intervals (TTIs) from a transmission of the RRS to a start of the transmission, or a frequency bandwidth occupied by the transmission.

The V2V or sidelink communications manager 1015 may receive a first transmission from a UE in the V2V or sidelink communication system via a subset of resources of the time-frequency resource pool. In some examples, the V2V or sidelink communications manager 1015 may transmit the first transmission to the one or more UEs. In some examples, the V2V or sidelink communications manager 1015 may communicate with one or more other UEs in the V2V or sidelink communications system based on the RRS.

In some examples, the V2V or sidelink communications manager 1015 may determine a set of blind decoding hypotheses for decoding the control channel, where a first subset of the set of blind decoding hypotheses corresponds to RRS transmissions and a second subset of the set of blind decoding hypotheses corresponds to transmissions (e.g. data transmissions). In some examples, the V2V or sidelink communications manager 1015 may decode a first portion of the control channel, where the first portion is a common portion to both RRS and transmissions, and may determine that the first transmission contains RRS based on an indication in the first portion that indicates an RRS transmission.

In some examples, the V2V or sidelink communications manager 1015 may encode the control channel according to a decoding candidate associated with a RRS transmission. In some examples, the V2V or sidelink communications manager 1015 may format the RRS into a first portion of the control channel, where the first portion is a common portion to both RRS and transmissions, and where a second portion of the control channel is configured to include information specific to transmissions.

The RRS manager 1020 may determine, based on information provided by one or more of a control channel associated with the first transmission or a payload of the first transmission, whether the first transmission contains a resource reservation signal (RRS) that indicates resources of the time-frequency resource pool or a transmission of the UE. In some examples, the RRS manager 1020 may determine that a transmission to one or more UEs in the V2V or sidelink communication system is to be transmitted.

In some examples, the RRS manager 1020 may format a resource reservation signal (RRS) that indicates a reservation of the resources of the time-frequency resource pool into a first transmission, where an indication that the first transmission includes the RRS is provided in one or more of a control channel associated with the first transmission or a payload of the first transmission.

In some examples, the RRS manager 1020 may determine a resource reservation signal (RRS) that indicates resources of a time-frequency resource pool available for V2V or sidelink communications for a transmission, the RRS indicating one or more of a size of an allocation of the resources and multiple locations of the resources within the time-frequency resource pool.

In some examples, the RRS manager 1020 may determine that the first transmission contains RRS or data based on a successful decoding hypothesis from the first subset of the set of blind decoding hypotheses or the second subset of the set of blind decoding hypotheses.

In some examples, the RRS manager 1020 may determine an RRS indication in the payload of the first transmission. In some examples, the RRS manager 1020 may provide an RRS indication in the payload of the first transmission. In some cases, the control channel includes information indicating RRS and a CRC.

In some cases, the payload of the first transmission includes a medium access control (MAC) control element (CE), information related to the resources of the time-frequency resource pool that are reserved by the UE, and the transmission of the UE. In some cases, the MAC-CE and information related to the resources of the time-frequency resource pool are included in an initial portion of the payload of the first transmission, and the transmission of the UE is included in a subsequent portion of the payload of the first transmission, and where a first modulation and coding scheme (MCS) or first spectral efficiency of the initial portion is less than or equal to a second MCS or second spectral efficiency of the subsequent portion.

In some cases, the RRS includes reservations for a number of transmissions, and a size of the RRS increases in proportion to a number of transmissions being reserved. In some cases, the RRS indicates reservations for multiple different packets of multiple different services of a V2V or sidelink UE. In some cases, the RRS further indicates a semi-persistent reservation of resources within the time-frequency resource pool, and where the semi-persistent reservation provides one or more of a periodicity of the reservation of resources, a duration of the reservation of resources, or combinations thereof. In some cases, the RRS indicates a reservation of resources for a RRS transmission. In some cases, the RRS is ignored by the UE based on the UE having no scheduled transmissions using the time-frequency resource pool for a predetermined period of time.

The control channel manager 1025 may determine a predetermined bit sequence in a first symbol of the first transmission that is associated with an RRS or transmission (e.g. data transmission). In some examples, the control channel manager 1025 may transmit a predetermined bit sequence in a first symbol of the first transmission that is associated with an RRS or transmission.

In some cases, the RRS control information includes a first part with one or more of an RRS size indication, a size of a resource allocation of the resources of the time-frequency resource pool that are reserved, a demodulation reference signal (DMRS) scheme of the payload of the first transmission, a UE identification of the UE, a time period associated with the resources of the time-frequency resource pool that are reserved, a priority of a transmission to be transmitted in the resources of the time-frequency resource pool that are reserved, or any combinations thereof. In some cases, a second part of the control information is for a V2V or sidelink transmission, and may include one or more of a rank indication (RI) of the first transmission, a modulation and coding scheme (MCS) of the first transmission, a transmission mode (TM) of the first transmission, a retransmission number of a data payload of the first transmission, a schedule for one or more retransmissions of the data payload of the first transmission, or any combinations thereof. In some cases, the UE decodes the second portion of the control channel only when the first portion of the control channel indicates that the first transmission is a transmission.

Figure 11:
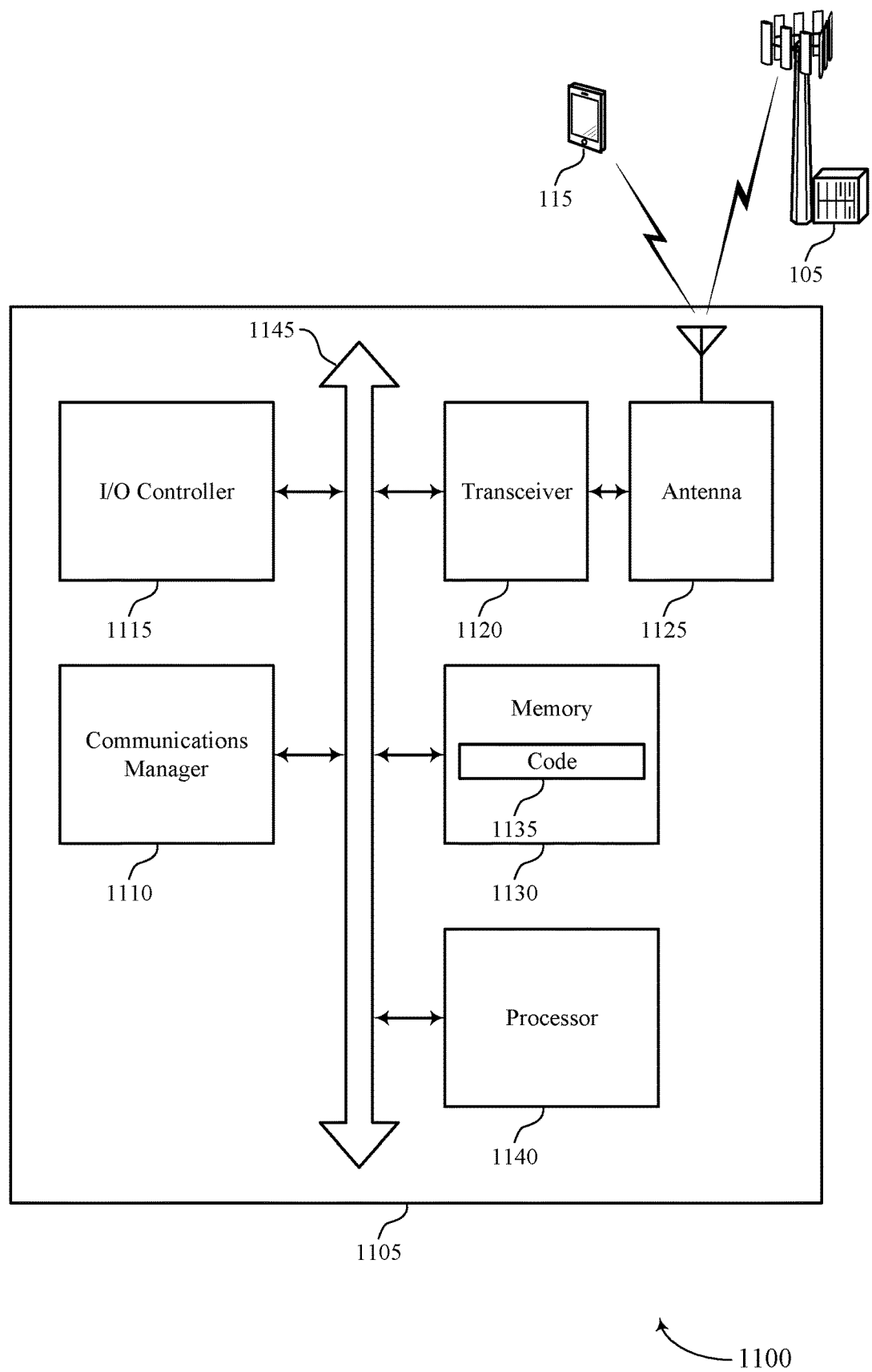
FIG. 11 shows a diagram of a system including a device that supports resource reservation techniques for sidelink communications in accordance with aspects of the present disclosure.

FIG. 11 shows a diagram of a system 1100 including a device 1105 that supports resource reservation techniques for sidelink communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may determine a time-frequency resource pool that provides wireless resources available for V2V or sidelink communications, receive a first transmission from a UE in the V2V or sidelink communication system via a subset of resources of the time-frequency resource pool, and determine, based on information provided by one or more of a control channel associated with the first transmission or a payload of the first transmission, whether the first transmission contains a resource reservation signal (RRS) that indicates resources of the time-frequency resource pool or a transmission of the UE.

The communications manager 1110 may also determine a time-frequency resource pool that provides wireless resources available for V2V or sidelink communications, select resources of the time-frequency resource pool for transmitting the transmission, determine that a transmission to one or more UEs in the V2V or sidelink communication system is to be transmitted, format a resource reservation signal (RRS) that indicates a reservation of the resources of the time-frequency resource pool into a first transmission, where an indication that the first transmission includes the RRS is provided in one or more of a control channel associated with the first transmission or a payload of the first transmission, and transmit the first transmission to the one or more UEs.

The communications manager 1110 may also determine a resource reservation signal (RRS) that indicates resources of a time-frequency resource pool available for V2V or sidelink communications for a transmission, the RRS indicating one or more of a size of an allocation of the resources and multiple locations of the resources within the time-frequency resource pool and communicate with one or more other UEs in the V2V or sidelink communications system based on the RRS.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting resource reservation techniques for vehicle-to-vehicle or sidelink communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
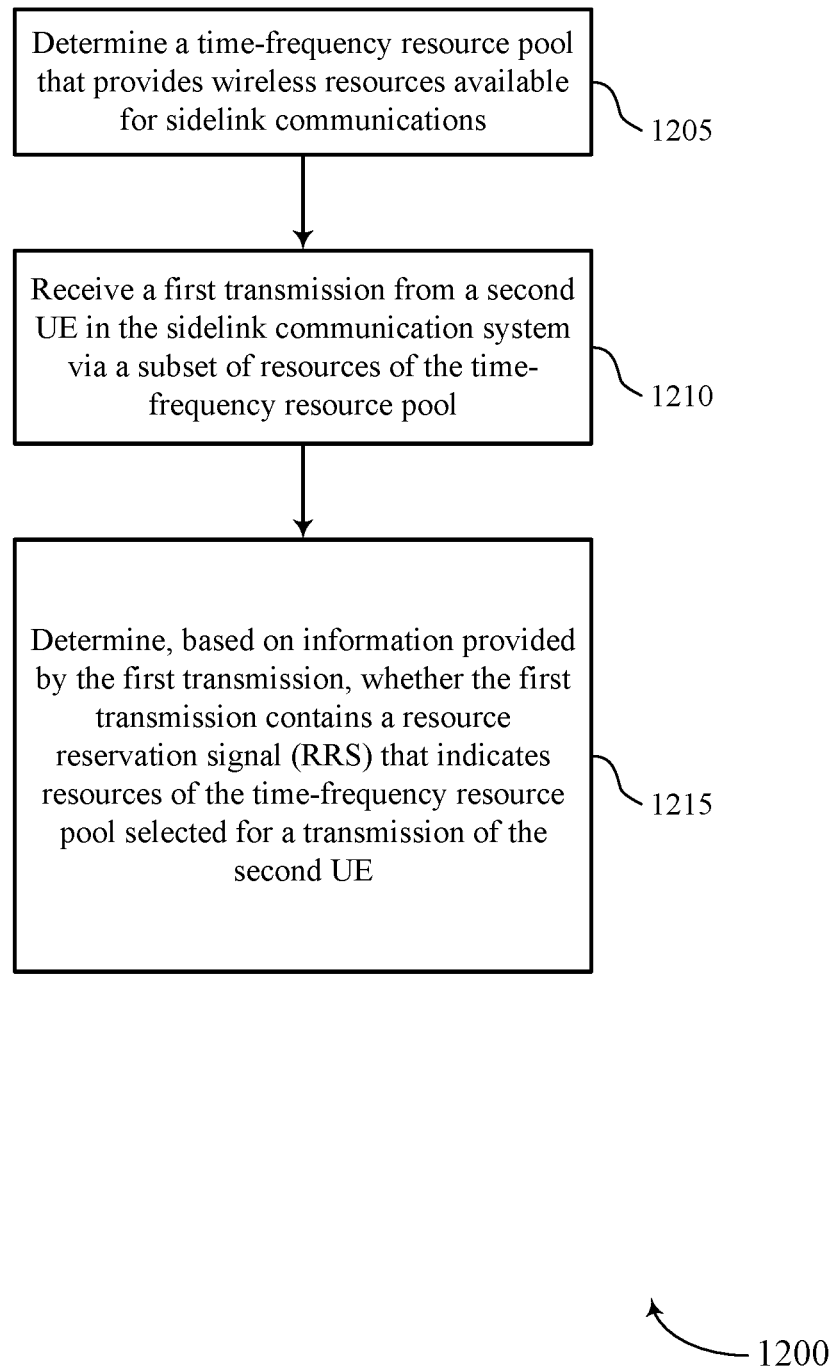
FIGS. 12 through 18 show flowcharts illustrating methods that support resource reservation techniques for sidelink communications in accordance with aspects of the present disclosure.

FIG. 12 shows a flowchart illustrating a method 1200 that supports resource reservation techniques for sidelink communications in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1205, the UE may determine a time-frequency resource pool that provides wireless resources available for sidelink communications. The operations of 1205 may be performed according to the methods described herein. In some examples, aspects of the operations of 1205 may be performed by an autonomous resource selection manager as described with reference to FIGS. 8 through 11.

At 1210, the UE may receive a first transmission from a second UE in the sidelink communication system via a subset of resources of the time-frequency resource pool. The operations of 1210 may be performed according to the methods described herein. In some examples, aspects of the operations of 1210 may be performed by a V2V or sidelink communications manager as described with reference to FIGS. 8 through 11.

At 1215, the UE may determine, based on information provided by the first transmission, whether the first transmission contains a resource reservation signal (RRS) that indicates resources of the time-frequency resource pool selected for a transmission of the second UE. The operations of 1215 may be performed according to the methods described herein. In some examples, aspects of the operations of 1215 may be performed by a RRS manager as described with reference to FIGS. 8 through 11.

Figure 13:
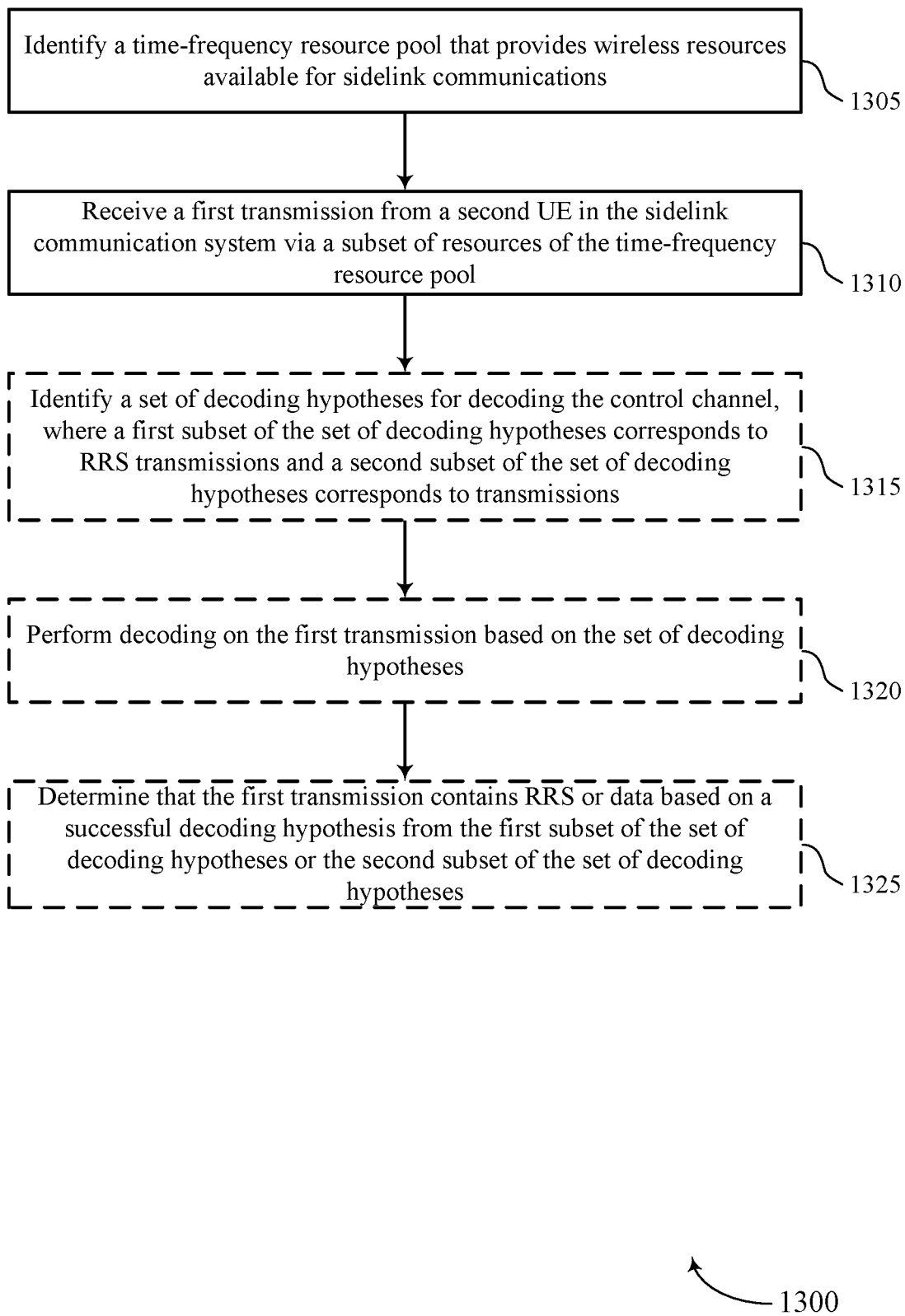

FIG. 13 shows a flowchart illustrating a method 1300 that supports resource reservation techniques for sidelink communications in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1305, the UE may determine a time-frequency resource pool that provides wireless resources available for V2V or sidelink communications. The operations of 1305 may be performed according to the methods described herein. In some examples, aspects of the operations of 1305 may be performed by an autonomous resource selection manager as described with reference to FIGS. 8 through 11.

At 1310, the UE may receive a first transmission from a second UE in the V2V communication system via a subset of resources of the time-frequency resource pool. The operations of 1310 may be performed according to the methods described herein. In some examples, aspects of the operations of 1310 may be performed by a V2V or sidelink communications manager as described with reference to FIGS. 8 through 11.

At 1315, the UE may determine a set of blind decoding hypotheses for decoding the control channel, where a first subset of the set of blind decoding hypotheses corresponds to RRS transmissions and a second subset of the set of blind decoding hypotheses corresponds to transmissions. The operations of 1315 may be performed according to the methods described herein. In some examples, aspects of the operations of 1315 may be performed by a V2V or sidelink communications manager as described with reference to FIGS. 8 through 11.

At 1320, the UE may perform decoding on the first transmission based on the set of blind decoding hypotheses. The operations of 1320 may be performed according to the methods described herein. In some examples, aspects of the operations of 1320 may be performed by an autonomous resource selection manager as described with reference to FIGS. 8 through 11.

At 1325, the UE may determine that the first transmission contains RRS or data based on a successful decoding hypothesis from the first subset of the set of blind decoding hypotheses or the second subset of the set of blind decoding hypotheses. The operations of 1325 may be performed according to the methods described herein. In some examples, aspects of the operations of 1325 may be performed by a RRS manager as described with reference to FIGS. 8 through 11.

Figure 14:
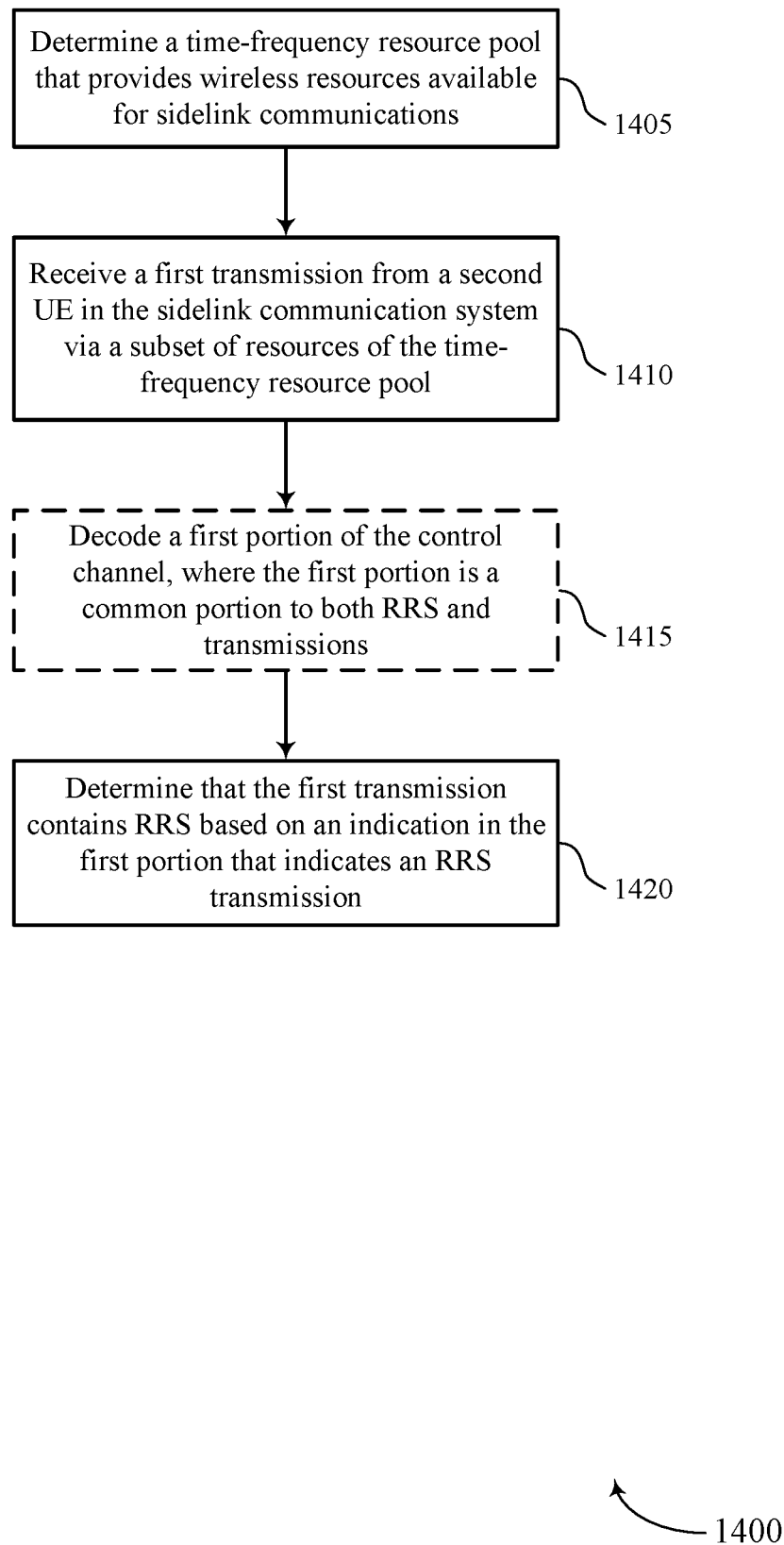

FIG. 14 shows a flowchart illustrating a method 1400 that supports resource reservation techniques for sidelink communications in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1405, the UE may determine a time-frequency resource pool that provides wireless resources available for V2V or sidelink communications. The operations of 1405 may be performed according to the methods described herein. In some examples, aspects of the operations of 1405 may be performed by an autonomous resource selection manager as described with reference to FIGS. 8 through 11.

At 1410, the UE may receive a first transmission from a second UE in the V2V communication system via a subset of resources of the time-frequency resource pool. The operations of 1410 may be performed according to the methods described herein. In some examples, aspects of the operations of 1410 may be performed by a V2V or sidelink communications manager as described with reference to FIGS. 8 through 11.

At 1415, the UE may decode a first portion of the control channel, where the first portion is a common portion to both RRS and transmissions. The operations of 1415 may be performed according to the methods described herein. In some examples, aspects of the operations of 1415 may be performed by a V2V or sidelink communications manager as described with reference to FIGS. 8 through 11.

At 1420, the UE may determine that the first transmission contains RRS based on an indication in the first portion that indicates an RRS transmission. The operations of 1420 may be performed according to the methods described herein. In some examples, aspects of the operations of 1420 may be performed by a V2V or sidelink communications manager as described with reference to FIGS. 8 through 11.

Figure 15:
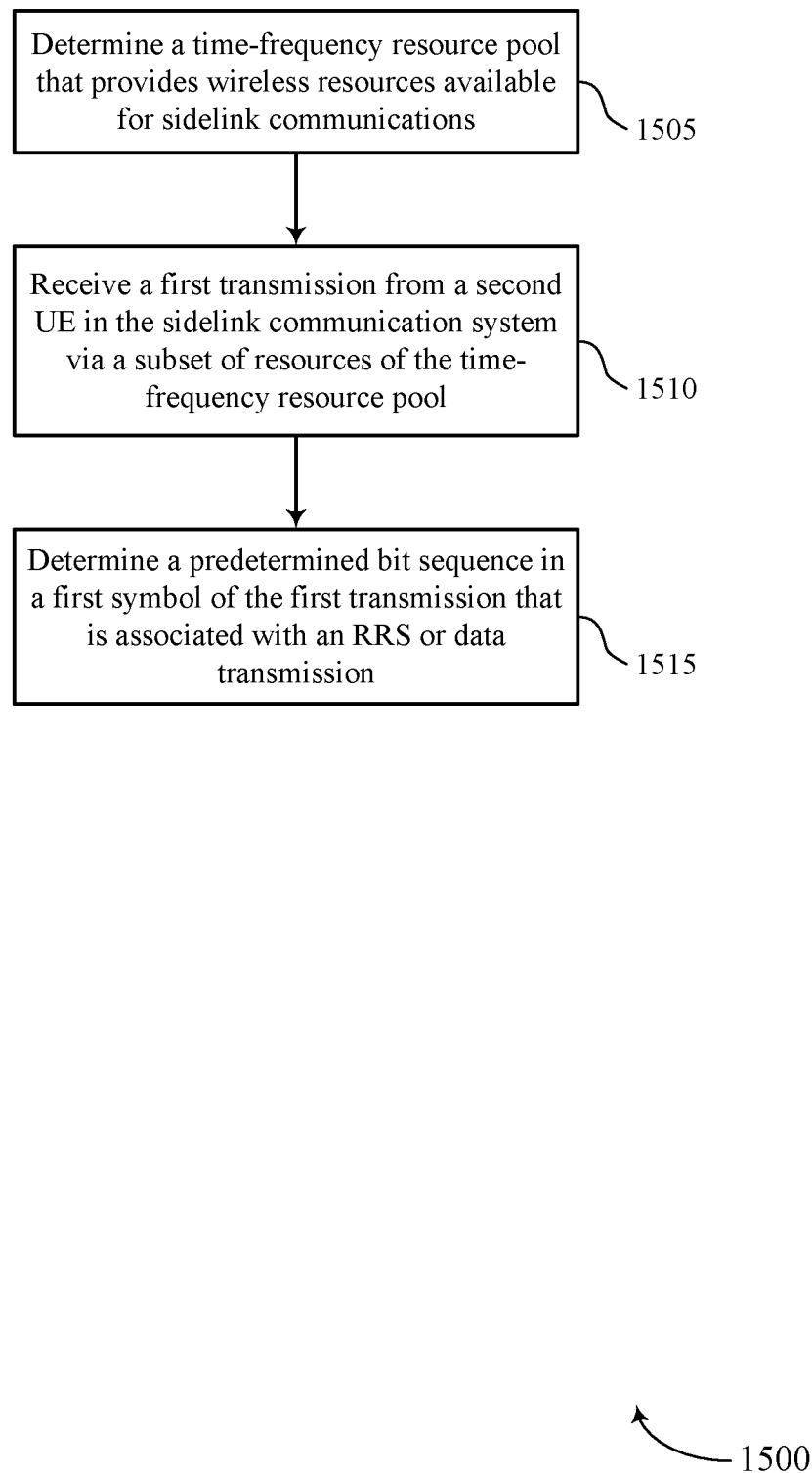

FIG. 15 shows a flowchart illustrating a method 1500 that supports resource reservation techniques for sidelink communications in accordance with aspects of the present disclosure. The operations of method 1500 may be implemented by a UE 115 or its components as described herein. For example, the operations of method 1500 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1505, the UE may determine a time-frequency resource pool that provides wireless resources available for V2V or sidelink communications. The operations of 1505 may be performed according to the methods described herein. In some examples, aspects of the operations of 1505 may be performed by an autonomous resource selection manager as described with reference to FIGS. 8 through 11.

At 1510, the UE may receive a first transmission from a second UE in the V2V communication system via a subset of resources of the time-frequency resource pool. The operations of 1510 may be performed according to the methods described herein. In some examples, aspects of the operations of 1510 may be performed by a V2V or sidelink communications manager as described with reference to FIGS. 8 through 11.

At 1515, the UE may determine a predetermined bit sequence in a first symbol of the first transmission that is associated with an RRS or transmission. The operations of 1515 may be performed according to the methods described herein. In some examples, aspects of the operations of 1515 may be performed by a control channel manager as described with reference to FIGS. 8 through 11.

Figure 16:
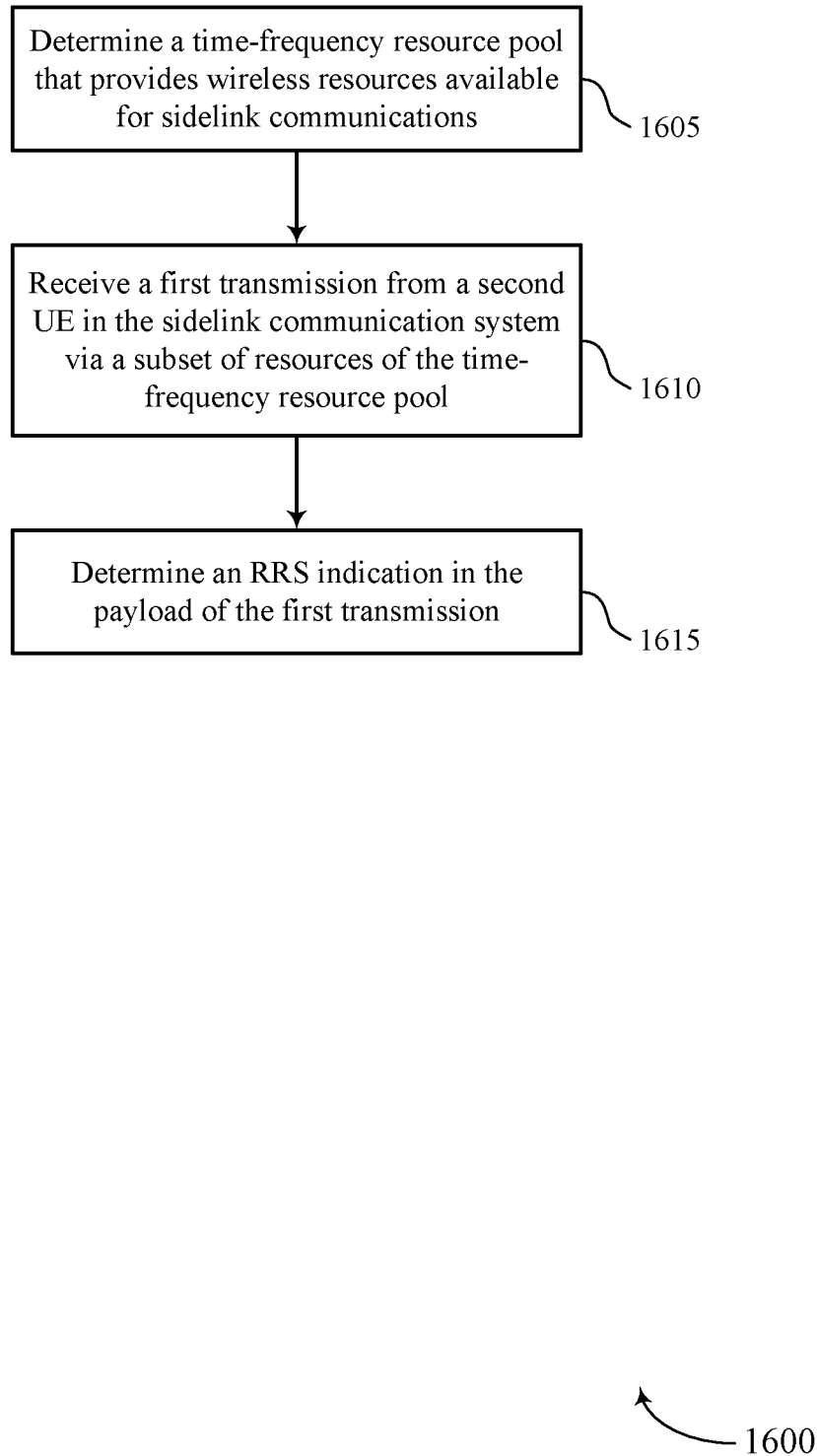

FIG. 16 shows a flowchart illustrating a method 1600 that supports resource reservation techniques for sidelink communications in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may determine a time-frequency resource pool that provides wireless resources available for V2V or sidelink communications. The operations of 1605 may be performed according to the methods described herein. In some examples, aspects of the operations of 1605 may be performed by an autonomous resource selection manager as described with reference to FIGS. 8 through 11.

At 1610, the UE may receive a first transmission from a second UE in the V2V communication system via a subset of resources of the time-frequency resource pool. The operations of 1610 may be performed according to the methods described herein. In some examples, aspects of the operations of 1610 may be performed by a V2V or sidelink communications manager as described with reference to FIGS. 8 through 11.

At 1615, the UE may determine an RRS indication in the payload of the first transmission. The operations of 1615 may be performed according to the methods described herein. In some examples, aspects of the operations of 1615 may be performed by a RRS manager as described with reference to FIGS. 8 through 11.

Figure 17:
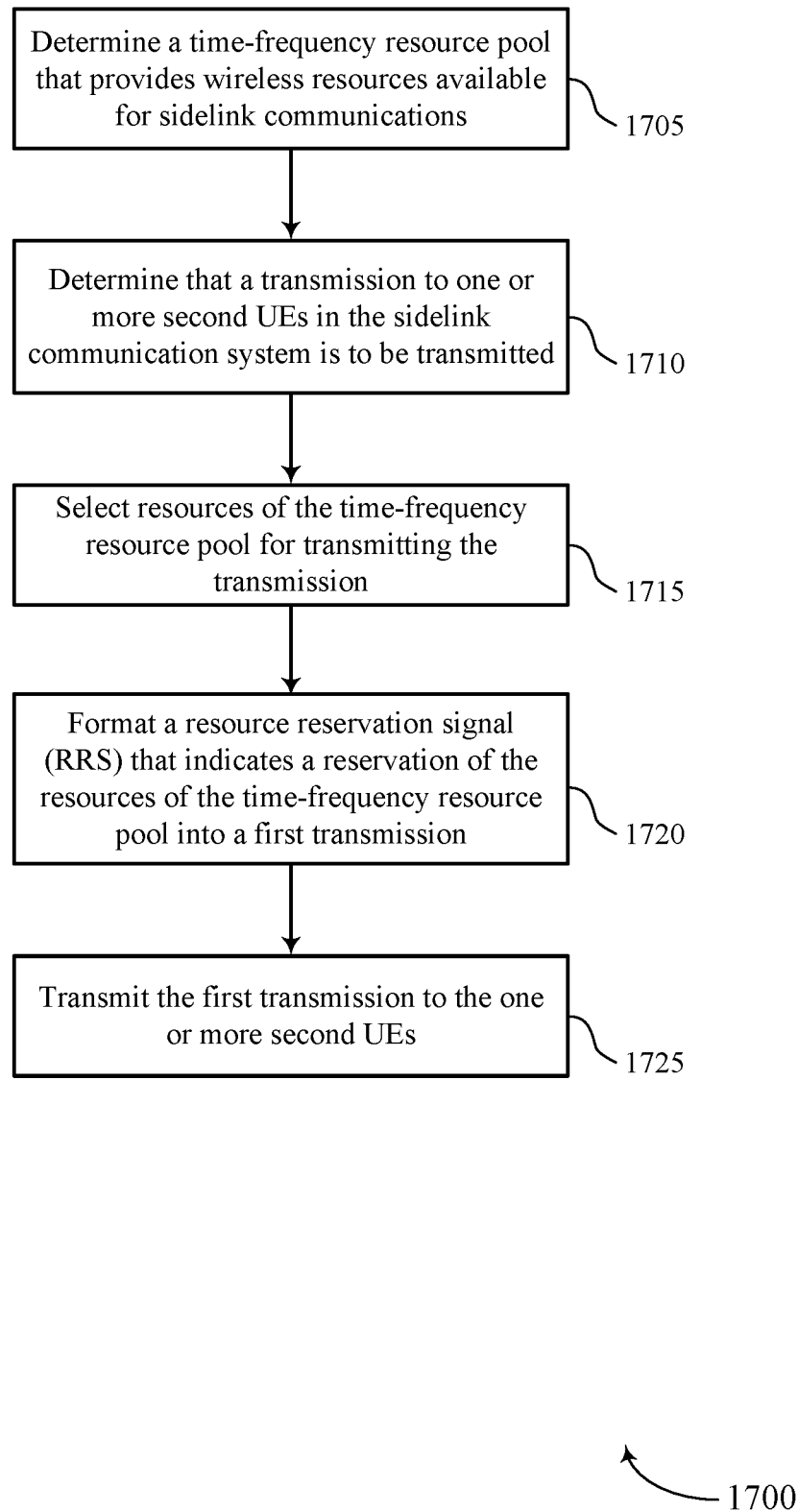

FIG. 17 shows a flowchart illustrating a method 1700 that supports resource reservation techniques for sidelink communications in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may determine a time-frequency resource pool that provides wireless resources available for sidelink communications. The operations of 1705 may be performed according to the methods described herein. In some examples, aspects of the operations of 1705 may be performed by an autonomous resource selection manager as described with reference to FIGS. 8 through 11.

At 1710, the UE may determine that a transmission to one or more second UEs in the sidelink communication system is to be transmitted. The operations of 1710 may be performed according to the methods described herein. In some examples, aspects of the operations of 1710 may be performed by a RRS manager as described with reference to FIGS. 8 through 11.

At 1715, the UE may select resources of the time-frequency resource pool for transmitting the transmission. The operations of 1715 may be performed according to the methods described herein. In some examples, aspects of the operations of 1715 may be performed by an autonomous resource selection manager as described with reference to FIGS. 8 through 11.

At 1720, the UE may format a resource reservation signal (RRS) that indicates a reservation of the resources of the time-frequency resource pool into a first transmission. The operations of 1720 may be performed according to the methods described herein. In some examples, aspects of the operations of 1720 may be performed by a RRS manager as described with reference to FIGS. 8 through 11.

At 1725, the UE may transmit the first transmission to the one or more second UEs. The operations of 1725 may be performed according to the methods described herein. In some examples, aspects of the operations of 1725 may be performed by a V2V or sidelink communications manager as described with reference to FIGS. 8 through 11.

Figure 18:
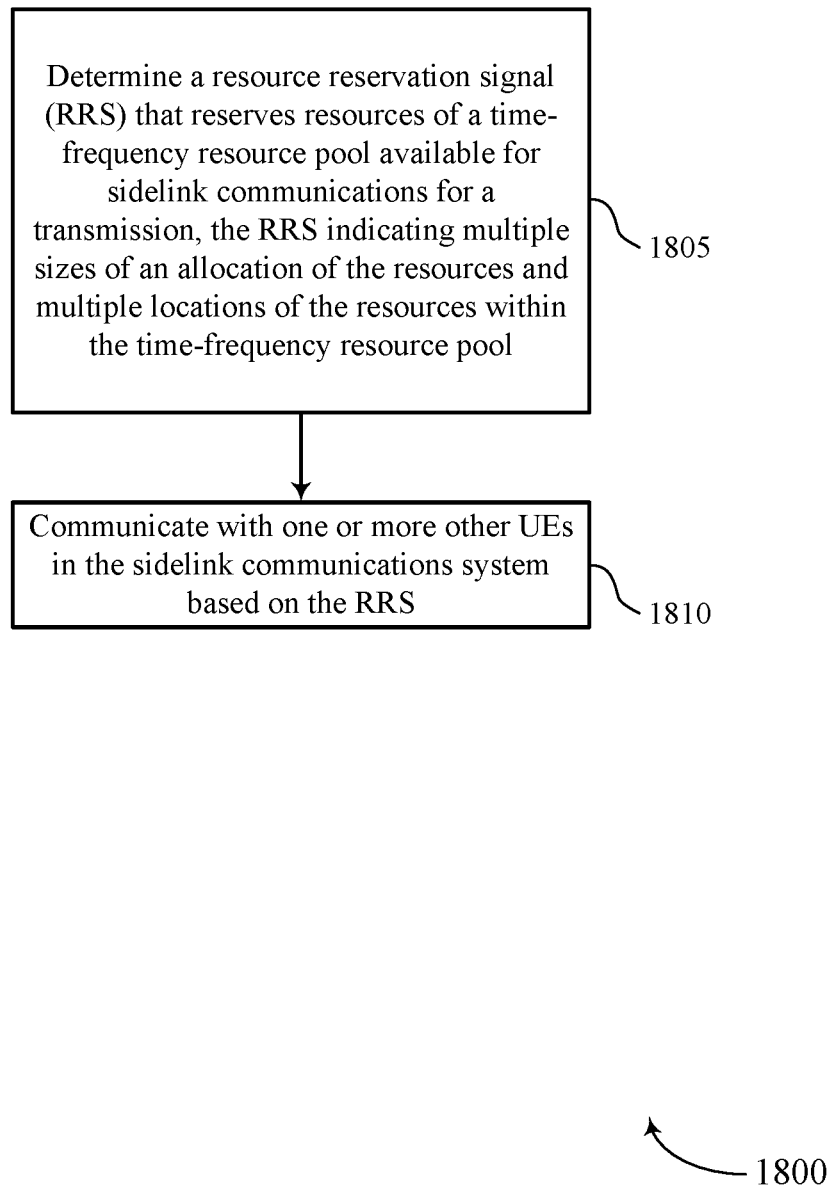

FIG. 18 shows a flowchart illustrating a method 1800 that supports resource reservation techniques for sidelink communications in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the UE may determine a resource reservation signal (RRS) that indicates resources of a time-frequency resource pool available for V2V or sidelink communications for a transmission, the RRS indicating one or more of a size of an allocation of the resources and multiple locations of the resources within the time-frequency resource pool. The operations of 1805 may be performed according to the methods described herein. In some examples, aspects of the operations of 1805 may be performed by a RRS manager as described with reference to FIGS. 8 through 11.

At 1810, the UE may communicate with one or more other UEs in the V2V or sidelink communications system based on the RRS. The operations of 1810 may be performed according to the methods described herein. In some examples, aspects of the operations of 1810 may be performed by a V2V or sidelink communications manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Example 1

A method of wireless communication, comprising: determining a time-frequency resource pool that provides wireless resources available for sidelink communications, receiving a first transmission from a second UE in the sidelink communication system via a subset of resources of the time-frequency resource pool, and determining, based at least in part on information provided by the first transmission, whether the first transmission contains a resource reservation signal (RRS) that indicates resources of the time-frequency resource pool selected for a transmission of the second UE.

Example 2

The method of example 1, further comprising: determining one or more of a control channel associated with the first transmission or a payload of the first transmission, decoding a first portion of the control channel, wherein the first portion is a common portion to both RRS and transmissions, and determining that the first transmission contains RRS based at least in part on an indication in the first portion that indicates an RRS transmission.

Example 3

The method of any of examples 1 or 2, wherein a second portion of the control channel contains information specific to transmissions.

Example 4

The method of any of examples 1 to 3, wherein the first portion of the control channel includes one or more of: a bit that indicates whether the first transmission contains RRS or data, an RRS size indication, a size of a resource allocation of the resources of the time-frequency resource pool that are reserved, a demodulation reference signal (DMRS) scheme of the payload of the first transmission, a UE identification of the second UE, a time period associated with the resources of the time-frequency resource pool that are reserved, a priority of a transmission to be transmitted in the resources of the time-frequency resource pool that are reserved, or; and any combinations thereof.

Example 5

The method of any of examples 1 to 4, wherein the second portion of the control channel includes one or more of: a rank indication (RI) of the first transmission, a modulation and coding scheme (MCS) of the first transmission, a transmission mode (TM) of the first transmission, a retransmission number of a data payload of the first transmission, a schedule for one or more retransmissions of the data payload of the first transmission, or; and any combinations thereof.

Example 6

The method of any of examples 1 to 5, wherein the first UE decodes the second portion of the control channel only when the first portion of the control channel indicates that the first transmission is data.

Example 7

The method of any of examples 1 to 6, wherein the determining whether the first transmission contains the RRS comprises: determining a plurality of decoding hypotheses for decoding the control channel, wherein a first subset of the plurality of decoding hypotheses corresponds to RRS transmissions and a second subset of the plurality of decoding hypotheses corresponds to transmissions, performing decoding on the first transmission based at least in part on the plurality of decoding hypotheses, and determining that the first transmission contains RRS or data based at least in part on a successful decoding hypothesis from the first subset of the plurality of decoding hypotheses or the second subset of the plurality of decoding hypotheses.

Example 8

The method of any of examples 1 to 7, wherein the control channel includes information indicating RRS and a cyclic redundancy check (CRC).

Example 9

The method of any of examples 1 to 8, wherein the determining whether the first transmission contains the RRS comprises: determining a predetermined bit sequence in a first symbol of the first transmission that is associated with an RRS or transmission.

Example 10

The method of any of examples 1 to 9, wherein the determining whether the first transmission contains the RRS comprises: determining an RRS indication in the payload of the first transmission.

Example 11

The method of any of examples 1 to 10, wherein the payload of the first transmission includes a medium access control (MAC) control element (CE), information related to the resources of the time-frequency resource pool that are reserved by the second UE, and the transmission of the second UE, or any combinations thereof.

Example 12

The method of any of examples 1 to 11, wherein the MAC-CE and information related to the reserved resources of the time-frequency resource pool are included in an initial portion of the payload of the first transmission, and the transmission of the second UE is included in a subsequent portion of the payload of the first transmission, and wherein a first modulation and coding scheme (MCS) or first spectral efficiency of the initial portion is less than or equal to a second MCS or second spectral efficiency of the subsequent portion.

Example 13

The method of any of examples 1 to 12, wherein the sidelink communication system is vehicle-to-vehicle (V2V) communication system.

Example 14

An apparatus comprising at least one means for performing a method of any of examples 1 to 13.

Example 15

An apparatus for wireless communications comprising a processor; memory in electronic communication with the processor; and instructions stored in the memory and executable by the processor to cause the apparatus to perform a method of any of examples 1 to 13.

Example 16

A non-transitory computer-readable medium storing code for wireless communications, the code comprising instructions executable by a processor to perform a method of any of examples 1 to 13.

Example 17

A method of wireless communication, comprising: determining a time-frequency resource pool that provides wireless resources available for sidelink communications, determining that a transmission to one or more second UEs in the sidelink communication system is to be transmitted, selecting resources of the time-frequency resource pool for transmitting of the transmission, formatting a resource reservation signal (RRS) that indicates a reservation of the resources of the time-frequency resource pool into a first transmission, and transmitting the first transmission to the one or more second UEs.

Example 18

The method of example 17, wherein an indication that the first transmission includes the RRS is provided in one or more of a control channel associated with the first transmission or a payload of the first transmission.

Example 19

The method of any of examples 17 or 18, wherein the formatting comprises: encoding the control channel according to a decoding candidate associated with a RRS transmission.

Example 20

The method of any of examples 17 to 19, wherein the control channel includes information indicating RRS and a cyclic redundancy check (CRC).

Example 21

The method of any of examples 17 to 20, wherein the formatting comprises: formatting the RRS into a first portion of the control channel, wherein the first portion is a common portion to both RRS and transmissions, and wherein a second portion of the control channel is configured to include information specific to transmissions.

Example 22

The method of any of examples 17 to 21, wherein the first portion of the control channel includes one or more of: a bit that indicates whether the first transmission contains RRS or data, an RRS size indication, a size of a resource allocation of the resources of the time-frequency resource pool that are reserved, a demodulation reference signal (DMRS) scheme of the payload of the first transmission, a UE identification of the first UE, a time period associated with the resources of the time-frequency resource pool that are reserved, a priority of a transmission to be transmitted in the resources of the time-frequency resource pool that are reserved, or any combinations thereof.

Example 23

The method of any of examples 17 to 22, wherein the second portion of the control channel includes one or more of: a rank indication (RI) of the first transmission; a modulation and coding scheme (MCS) of the first transmission; a transmission mode (TM) of the first transmission; a retransmission number of a data payload of the first transmission; a schedule for one or more retransmissions of the data payload of the first transmission; or; and any combinations thereof.

Example 24

The method of any of examples 17 to 23, wherein the formatting comprises: transmitting a predetermined bit sequence in a first symbol of the first transmission that is associated with an RRS or transmission.

Example 25

The method of any of examples 17 to 24, wherein the formatting comprises: providing an RRS indication in the payload of the first transmission.

Example 26

The method of any of examples 17 to 25, wherein the payload of the first transmission includes a medium access control (MAC) control element (CE), information related to the resources of the time-frequency resource pool that are reserved by the first UE, and a transmission of the first UE.

Example 27

The method of any of examples 17 to 26, wherein the MAC-CE and information related to the resources of the time-frequency resource pool are included in an initial portion of the payload of the first transmission, and the transmission of the first UE is included in a subsequent portion of the payload of the first transmission, and wherein a first modulation and coding scheme (MCS) or first spectral efficiency of the initial portion is less than or equal to a second MCS or second spectral efficiency of the subsequent portion.

Example 28

An apparatus comprising at least one means for performing a method of any of examples 17 to 27.

Example 15

An apparatus for wireless communications comprising a processor; memory in electronic communication with the processor; and instructions stored in the memory and executable by the processor to cause the apparatus to perform a method of any of examples 17 to 27.

Example 16

A non-transitory computer-readable medium storing code for wireless communications, the code comprising instructions executable by a processor to perform a method of any of examples 17 to 27.

What is claimed is:

1. A method for wireless communication at a first user equipment (UE) in a sidelink communication system, comprising:
   determining a time-frequency resource pool that provides wireless resources available for sidelink communications;
   receiving a first transmission from a second UE in the sidelink communication system via a subset of resources of the time-frequency resource pool, the first transmission comprising a control channel;
   decoding a first portion of the control channel, wherein the first portion comprises an indicator of whether a subsequent portion of the first transmission comprises a resource reservation signal (RRS) that indicates resources of the time-frequency resource pool selected for an upcoming transmission of the second UE or a data transmission and not the RRS; and
   updating the time-frequency resource pool in accordance with the RRS or decoding the data transmission based at least in part on the indicator.

2. The method of claim 1, wherein a second portion of the control channel contains information specific to data transmissions.

3. The method of claim 2, wherein the first portion of the control channel includes one or more of:
   a bit that indicates whether the first transmission contains RRS or data;
   an RRS size indication;
   a size of a resource allocation of future resources of the time-frequency resource pool that are reserved;
   a demodulation reference signal (DMRS) scheme of a payload of the first transmission;
   a UE identification of the second UE;
   a time period associated with future resources of the time-frequency resource pool that are reserved;
   a priority of an upcoming data transmission to be transmitted in the future resources of the time-frequency resource pool that are reserved; or
   any combinations thereof.

4. The method of claim 2, wherein the second portion of the control channel includes one or more of:
   a rank indication (RI) of the first transmission;
   a modulation and coding scheme (MCS) of the first transmission;
   a transmission mode (TM) of the first transmission;
   a retransmission number of a data payload of the first transmission;
   a schedule for one or more retransmissions of the data payload of the first transmission; or
   any combinations thereof.

5. The method of claim 2, wherein the first UE decodes the second portion of the control channel only when the first portion of the control channel indicates that the first transmission is a data transmission.

6. The method of claim 1, wherein the sidelink communication system is vehicle-to-vehicle (V2V) communication system.

7. A method for wireless communication at a first user equipment (UE) in a sidelink communication system, comprising:
   determining a time-frequency resource pool that provides wireless resources available for sidelink communications;
   determining that an upcoming transmission to one or more second UEs in the sidelink communication system is to be transmitted;
   selecting resources of the time-frequency resource pool for transmitting the upcoming transmission to the one or more second UEs;
   formatting a resource reservation signal (RRS) into a first transmission, the RRS indicating a reservation of the resources of the time-frequency resource pool for the upcoming transmission to the one or more second UEs;
   formatting the RRS into a first portion of a control channel of the first transmission, wherein the first portion comprises an indicator of whether a subsequent portion of the first transmission comprises a resource reservation signal (RRS) or a data transmission and not the RRS; and
   transmitting the first transmission to the one or more second UEs.

8. The method of claim 7,
   wherein a second portion of the control channel is configured to include information specific to data transmissions.

9. The method of claim 8, wherein the first portion of the control channel includes one or more of:
   a bit that indicates whether the first transmission contains RRS or data;
   an RRS size indication;
   a size of a resource allocation of the resources of the time-frequency resource pool that are reserved;
   a demodulation reference signal (DMRS) scheme of a payload of the first transmission;
   a UE identification of the first UE;
   a time period associated with the resources of the time-frequency resource pool that are reserved;
   a priority of a data transmission to be transmitted in the resources of the time-frequency resource pool that are reserved; or
   any combinations thereof.

10. The method of claim 8, wherein the second portion of the control channel includes one or more of:
    a rank indication (RI) of the first transmission;
    a modulation and coding scheme (MCS) of the first transmission;
    a transmission mode (TM) of the first transmission;
    a retransmission number of a data payload of the first transmission;
    a schedule for one or more retransmissions of the data payload of the first transmission; or
    any combinations thereof.

11. An apparatus for wireless communications at a user equipment (UE) in a sidelink communication system, comprising:
   a transceiver;
   one or more processors; and
   memory coupled to the one or more processors, the memory comprising instructions executable by the one or more processors to cause the apparatus to:
   determine a time-frequency resource pool that provides wireless resources available for sidelink communications;
   receive a first transmission from a second UE in the sidelink communication system via a subset of resources of the time-frequency resource pool, the first transmission comprising a control channel;
   decode a first portion of the control channel, wherein the first portion comprises an indicator of whether a subsequent portion of the first transmission comprises a resource reservation signal (RRS) that indicates resources of the time-frequency resource pool selected for an upcoming transmission of the second UE or a data transmission and not the RRS; and
   updating the time-frequency resource pool in accordance with the RRS or decoding the data transmission based at least in part on the indicator.

12. The apparatus of claim 11, wherein a second portion of the control channel contains information specific to data transmissions.

13. The apparatus of claim 12, wherein the first portion of the control channel includes one or more of:
   a bit that indicates whether the first transmission contains RRS or data;
   an RRS size indication;
   a size of a resource allocation of future resources of the time-frequency resource pool that are reserved;
   a demodulation reference signal (DMRS) scheme of a payload of the first transmission;
   a UE identification of the second UE;
   a time period associated with future resources of the time-frequency resource pool that are reserved;
   a priority of an upcoming data transmission to be transmitted in the future resources of the time-frequency resource pool that are reserved; or;
   any combinations thereof.

14. The apparatus of claim 12, wherein the second portion of the control channel includes one or more of:
   a rank indication (RI) of the first transmission;
   a modulation and coding scheme (MCS) of the first transmission;
   a transmission mode (TM) of the first transmission;
   a retransmission number of a data payload of the first transmission;
   a schedule for one or more retransmissions of the data payload of the first transmission; or;
   any combinations thereof.

15. The apparatus of claim 12, wherein the first UE decodes the second portion of the control channel only when the first portion of the control channel indicates that the first transmission is a data transmission.

16. An apparatus for wireless communications at a user equipment (UE) in a sidelink communication system, comprising:
   a transceiver;
   one or more processors; and
   memory coupled to the one or more processors, the memory comprising instructions executable by the one or more processors to cause the apparatus to:
   determine a time-frequency resource pool that provides wireless resources available for sidelink communications;
   determine that an upcoming transmission to one or more second UEs in the sidelink communication system is to be transmitted;
   select resources of the time-frequency resource pool for transmitting the upcoming transmission to the one or more second UEs;
   format a resource reservation signal (RRS) into a first transmission, the RRS indicating a reservation of the resources of the time-frequency resource pool for the upcoming transmission to the one or more second UEs;
   format the RRS into a first portion of a control channel of the first transmission, wherein the first portion comprises an indicator of whether a subsequent portion of the first transmission comprises a resource reservation signal (RRS) or a data transmission and not both; and
   transmit the first transmission to the one or more second UEs.

17. The apparatus of claim 16, wherein a second portion of the control channel is configured to include information specific to data transmissions.

18. The apparatus of claim 17, wherein the first portion of the control channel includes one or more of:
   a bit that indicates whether the first transmission contains RRS or data;
   an RRS size indication;
   a size of a resource allocation of the resources of the time-frequency resource pool that are reserved;
   a demodulation reference signal (DMRS) scheme of a payload of the first transmission;
   a UE identification of the first UE;
   a time period associated with the resources of the time-frequency resource pool that are reserved;
   a priority of a data transmission to be transmitted in the resources of the time-frequency resource pool that are reserved; or;
   any combinations thereof.

19. The apparatus of claim 17, wherein the second portion of the control channel includes one or more of:
   a rank indication (RI) of the first transmission;
   a modulation and coding scheme (MCS) of the first transmission;
   a transmission mode (TM) of the first transmission;
   a retransmission number of a data payload of the first transmission;
   a schedule for one or more retransmissions of the data payload of the first transmission; or;
   any combinations thereof.

\* \* \* \* \*